US011968770B2

(12) United States Patent
Hunt

(10) Patent No.: US 11,968,770 B2
(45) Date of Patent: Apr. 23, 2024

(54) SYSTEM AND METHOD FOR GENERATING AND CONTAINING A PLASMA

(71) Applicant: Plassein Technologies Ltd. LLC, Las Vegas, NV (US)

(72) Inventor: Jack A. Hunt, Covert, MI (US)

(73) Assignee: Plassein Technologies Ltd. LLC, Las Vegas, NV (US)

( * ) Notice: Subject to any disclaimer, the term of this patent is extended or adjusted under 35 U.S.C. 154(b) by 0 days.

(21) Appl. No.: 17/244,072

(22) Filed: Apr. 29, 2021

(65) Prior Publication Data

US 2021/0410265 A1 Dec. 30, 2021

Related U.S. Application Data

(63) Continuation of application No. 16/287,271, filed on Feb. 27, 2019, now Pat. No. 11,044,800, which is a continuation of application No. PCT/US2017/049178, filed on Aug. 29, 2017.

(60) Provisional application No. 62/551,474, filed on Aug. 29, 2017, provisional application No. 62/380,935, filed on Aug. 29, 2016.

(51) Int. Cl.
*H05H 1/36* (2006.01)
*H05H 1/40* (2006.01)
*H05H 1/48* (2006.01)

(52) U.S. Cl.
CPC ................ *H05H 1/36* (2013.01); *H05H 1/40* (2013.01); *H05H 1/48* (2013.01)

(58) Field of Classification Search
CPC .................................. H05H 1/36; H05H 1/40
See application file for complete search history.

(56) References Cited

U.S. PATENT DOCUMENTS 2,944,140 A * 7/1960 Giannini .................. H05H 1/34 219/121.52
4,352,044 A * 9/1982 Zhukov .................... H05H 1/44 219/121.48
4,678,888 A * 7/1987 Camacho ................ H05H 1/28 219/121.57
5,852,927 A * 12/1998 Cohn ...................... F02B 43/10 290/52
10,858,296 B1 * 12/2020 Myrick ................... C06B 45/04
2007/0186472 A1 * 8/2007 Rabovitser ............. B01J 19/088 422/186
2008/0056961 A1 * 3/2008 Matveev .................. F23R 3/58 422/224

(Continued)

FOREIGN PATENT DOCUMENTS

WO WO-2016134734 A1 * 9/2016 ............... G21B 1/03

*Primary Examiner* — Alexander H Taningco
*Assistant Examiner* — Pedro C Fernandez
(74) *Attorney, Agent, or Firm* — Larry E. Henneman, Jr.; Henneman & Associates, PLC

(57) ABSTRACT

A novel plasma generation and containment system includes a first electrode, a second electrode, a power source, and an electromagnet. The first electrode and the second electrode are electrically coupled via a wire to form an open circuit. The voltage is asserted on the open circuit to form a spark between the first electrode and the second electrode to form a closed circuit. Then, a current is asserted on the closed circuit to form a plasma between the first electrode and the second electrode. The electromagnet provides a magnetic field to contain and compress the plasma.

20 Claims, 40 Drawing Sheets

(56) References Cited

U.S. PATENT DOCUMENTS

2013/0333288 A1* 12/2013 Richley .................. C10B 47/06
48/113

* cited by examiner

SYSTEM AND METHOD FOR GENERATING AND CONTAINING A PLASMA

CROSS-REFERENCE TO RELATED APPLICATIONS

This application is a continuation of co-pending U.S. patent application Ser. No. 16/287,271, filed Feb. 27, 2019 by the same inventor, which is a continuation of PCT Application No. PCT/US2017/049178, filed Aug. 29, 2017 and having the same inventor, which claims priority to U.S. Provisional Application No. 62/551,474, filed Aug. 29, 2017 and having the same inventor, and also claims priority to U.S. Provisional Application No. 62/380,935, filed Aug. 29, 2016 and having the same inventor, all of which are incorporated by reference herein in their respective entireties.

BACKGROUND OF THE INVENTION

Field of the Invention

This invention relates generally to plasma generating devices, and more particularly to devices for generating, maintaining, containing, and controlling a plasma.

Background

Plasma generating devices are known. Plasma arc welders are one example of known plasma generating devices. Plasma arc welders utilize an electrode connected to a voltage source to generate an electric arc between the electrode and a work piece (a metal being welded). The electric arc heats gases that are provided to the work area, to generate a plasma that is sufficiently hot as to melt the metal used to create the weld.

Other plasma generating devices exist in the form of plasma torch furnaces. Plasma torch furnaces use a central electrode suspended over a bottom electrode to generate an electrical arc therebetween. Gases within a cavity containing the electrodes are heated by the arc and ionize to form the plasma. The plasma can be used to ionize materials, which are introduced into the cavity.

SUMMARY

Example methods for generating and using a high energy (e.g., heat generating, particle generating, etc.) plasma are disclosed. One example method includes providing a first conductive element, providing a second conductive element spaced apart from the first conductive element, and electrically coupling the first conductive element and the second conductive element with a control circuit to form an open ignition circuit. The example method additionally includes asserting a voltage across the open ignition circuit. The voltage is sufficient to form a spark between the first conductive element and the second conductive element to form a closed ignition circuit. The example method additionally includes providing a current through the closed ignition circuit. The current is sufficient to sustain the high energy plasma between the first conductive element and the second conductive element. A magnetic field is generated around the first conductive element and the second conductive element sufficient to contain the high energy plasma.

In a particular example method, the step of providing a first conductive element includes providing a radially symmetric conductive element having an axis of symmetry. The step of providing a second conductive element includes providing a substantially cylindrical conductive element and aligning an axis of the cylindrical conductive element with the axis of symmetry. The step of generating a magnetic field around the first conductive element and the second conductive element includes aligning the magnetic field along the axis of symmetry.

Another example method additionally includes providing fuel to the high energy plasma. An even more particular example method includes providing a heat exchanger disposed to absorb thermal energy generated by the plasma, and providing a thermal transfer medium in contact with the heat exchanger. The thermal transfer medium transfers the thermal energy generated by the plasma from the heat exchanger to another system. For example, one method includes utilizing the transferred thermal energy to generate electricity. A portion of the generated electricity is used to charge an electrical storage system, which is coupled to provide electrical energy sufficient to assert the voltage on the open ignition circuit and provide the current through the closed ignition circuit.

In another example method, the step of providing fuel to the plasma includes providing a waste product to the plasma. Another example method additionally includes positioning a target material within a predetermined distance of the plasma, and bombarding the target material with particles having energy of at least 5 MeV.

Systems for producing and containing a high energy plasma are also disclosed. One example system includes a first conductive element, a second conductive element spaced apart from the first conductive element, and a control circuit electrically coupling the first conductive element and the second conductive element to form an open ignition circuit. The example system additionally includes a voltage source operative to assert a voltage across the open ignition circuit. The asserted voltage is sufficient to form a spark between the first conductive element and the second conductive element to form a closed ignition circuit. A current source is operative to provide a current through the closed ignition circuit sufficient to sustain the high energy plasma. A magnet is operative to generate a magnetic field around the first conductive element and the second conductive element sufficient to contain the high energy plasma.

In a particular example system, the first conductive element is a radially symmetric conductive element having an axis of symmetry. The second conductive element is a substantially cylindrical conductive element, and an axis of the cylindrical conductive element is aligned with the axis of symmetry. The magnetic field is aligned along the axis of symmetry.

Another example system additionally includes a fuel system operative to provide fuel to the plasma and a heat exchanger. The heat exchanger is disposed to absorb thermal energy generated by the plasma and is configured to conduct a thermal transfer medium. The thermal transfer medium is in thermal contact with the heat exchanger and transfers the thermal energy generated by the plasma from the heat exchanger to another system. In a particular example system, the other system is a generator operative to utilize the thermal energy transferred by the thermal transfer medium to generate electrical power. The system additionally includes an electrical storage system, which is coupled to receive the electrical power, store at least a portion of the electrical power, and provide the electrical power to the control circuit for use in generating the voltage across the open ignition circuit and the current through the closed ignition circuit.

In another example system, the fuel is a waste product. Yet another example system includes a sample chamber disposed with respect to the plasma such that material within the sample chamber is exposed to particles from the plasma having an energy of at least 5 MeV.

Another example method includes providing an annular electrode and providing a second electrode disposed within an interior of the annular electrode. The annular electrode and the second electrode define a space therebetween. The example method additionally includes generating a magnetic field that permeates the space and forming a high energy plasma within the space. The magnetic field at least partially confines the high energy plasma within the space. Electrical current is provided between the annular electrode and the second electrode, through the plasma, to maintain the plasma. Optionally, the example method additionally includes introducing a gas flow into the space.

In a particular example method, the step of forming the plasma within the space includes asserting an initiating voltage across the annular electrode and the second electrode sufficient to form a spark between the annular electrode and the second electrode. The electrical current is then provided through a conductive path generated by the spark.

In another particular example method, the step of providing the electrical current includes providing a DC voltage across the annular electrode and the second electrode. The method additionally includes superimposing an AC voltage on the DC voltage. The step of providing electrical current between the annular electrode and the second electrode additionally includes allowing electrical noise from the plasma to feedback into a circuit providing the electrical current. In yet another example method, the step of generating a magnetic field that permeates the space includes orienting the magnetic field to cause the plasma to rotate within the space.

Another example method additionally includes providing fuel to the plasma. Optionally, the second electrode can be used as a fuel, and the example method includes gradually feeding the second electrode into the space as the second electrode is consumed. As another option, the step of providing fuel to the plasma can include providing a waste product to the plasma.

Another particular example method additionally includes capturing thermal energy generated by the plasma and converting the thermal energy to electrical energy. The step of converting the thermal energy to electrical energy can include generating more electrical energy than is necessary to sustain the plasma.

Various alternative methods for using the plasma system are disclosed. For example, one method includes using the plasma to subject a target to high energy particles from the plasma.

Another example plasma system includes an annular electrode and a second electrode disposed within an interior of the annular electrode. The annular electrode and the second electrode define a space therebetween. A plasma generator is configured to initiate a high energy plasma within the space, and a magnetic is configured to generate a magnetic field that permeates the space. The magnetic field at least partially confines the high energy plasma within the space. A current source is coupled to provide electrical current between the annular electrode and the second electrode, and through the plasma, to maintain the plasma. Optionally, the annular electrode includes a plurality of cylindrical elements arranged in side-by-side fashion around the inner surface of the annular electrode. The central axes of the cylindrical elements are oriented parallel to one another. As another option, the system can additionally include at least one fluid inlet disposed to introduce a gas flow into the space.

A particular example system additionally includes a voltage source coupled to assert a voltage across the annular electrode and the second electrode. The voltage is sufficient to form a spark between the annular electrode and the second electrode, and the current source is operative to provide the current through a conductive path provided by the spark. The current source is additionally operative to provide a DC voltage across the annular electrode and the second electrode and to superimpose an AC voltage on the DC voltage. The current source is coupled to provide the current in a manner that facilitates feedback of noise from the plasma into the current source.

In an example system, the magnetic field is aligned with an axis passing through the space. The axis is perpendicular to a transverse plane of the annular electrode. The magnet includes a plurality of circumferential windings around the annular electrode.

A more particular example plasma system additionally incudes a fuel system configured to introduce fuel into the plasma. The example system additionally includes a heat exchanger disposed to absorb thermal energy generated by the plasma and configured to transfer the thermal energy to another system. For example, the system can additionally include a generator operative to utilize the thermal energy to generate electrical power. The example system can also include an electrical storage system, coupled to receive the electrical power, to store at least a portion of the electrical power, and to provide the electrical power to the current source. Optionally, the fuel can be a waste product.

Another example system additionally includes a sample chamber. The sample chamber is disposed with respect to the plasma such that material within the sample chamber is exposed to high energy particles from the plasma.

In a particular example system, the plasma generator includes a transformer. The transformer is capable of providing 40 kV at 1 amp. In the example system, the transformer the transformer includes a single primary winding and 30 secondary windings.

In the example system, the current source includes a capacitor set coupled to discharge across the space when a conductive path is provided between the annular electrode and the second electrode. The capacitor set is capable of supplying at least 1000 V at 200 amps. The current source additionally includes a rectifier for providing DC power to the capacitor set, and a low pass filter coupled between the rectifier and the capacitor set. The current source further includes an RLC (resistor-inductor-capacitor) circuit coupled to assert an AC voltage on the DC voltage provided by the capacitor set.

A sustained plasma is also disclosed. The plasm is sustained between a rod-shaped anode and an annular cathode. The rod-shaped anode can include a material selected from a group consisting of carbon, graphite, tungsten, and tungsten alloys. In addition, the annular cathode is surrounded by an electromagnet. The plasma is maintained by supplying direct current to a circuit connected between the anode and cathode and including in series an inductor and a capacitor.

In an example sustained plasma, the cathode consists of a plurality of cylinders or half-cylinders arrayed in a circle. Optionally, the annular cathode comprises steps of increasing diameter extending in both directions from a central annulus. As another option, the rod can be fed in as it is consumed to sustain the plasma. In a particular example, the plasma is formed from air. Optionally, the sustained plasma additionally incudes gas vented towards the plasma from vents circumferentially surrounding the plasma.

An example apparatus includes an anode rod and an annular cathode. The anode rod is composed of a conductive material, and the annular cathode surrounds a portion of the anode rod. A sustaining circuit is connected between the anode rod and the annular cathode. The sustaining circuit incudes an inductor and a capacitor connected in series. A direct current source is connected to the sustaining circuit, and an electromagnet surrounds the annular cathode.

In a particular example apparatus, the direct current source includes a pair of terminals connected on opposite sides of said capacitor. In another particular example apparatus, the annular cathode comprises a plurality of cathode rods or half rods arranged in a circle, a surface of each cathode rods or half rods facing the anode rod. Yet another example apparatus additionally includes a plurality of vents arranged cylindrically adjacent say annular cathode; and a source of gas communicating with each vent.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a system capable of generating and controlling a sustained plasma, and for introducing fuel into the sustained plasma. In the following description, numerous specific details are set forth (e.g., particular values of electronic components) in order to provide a thorough understanding of the invention. Those skilled in the art will recognize, however, that the invention may be practiced apart from these specific details. In other instances, details of well-known plasma generating practices and components have been omitted, so as not to unnecessarily obscure the present invention.

Figure 1:
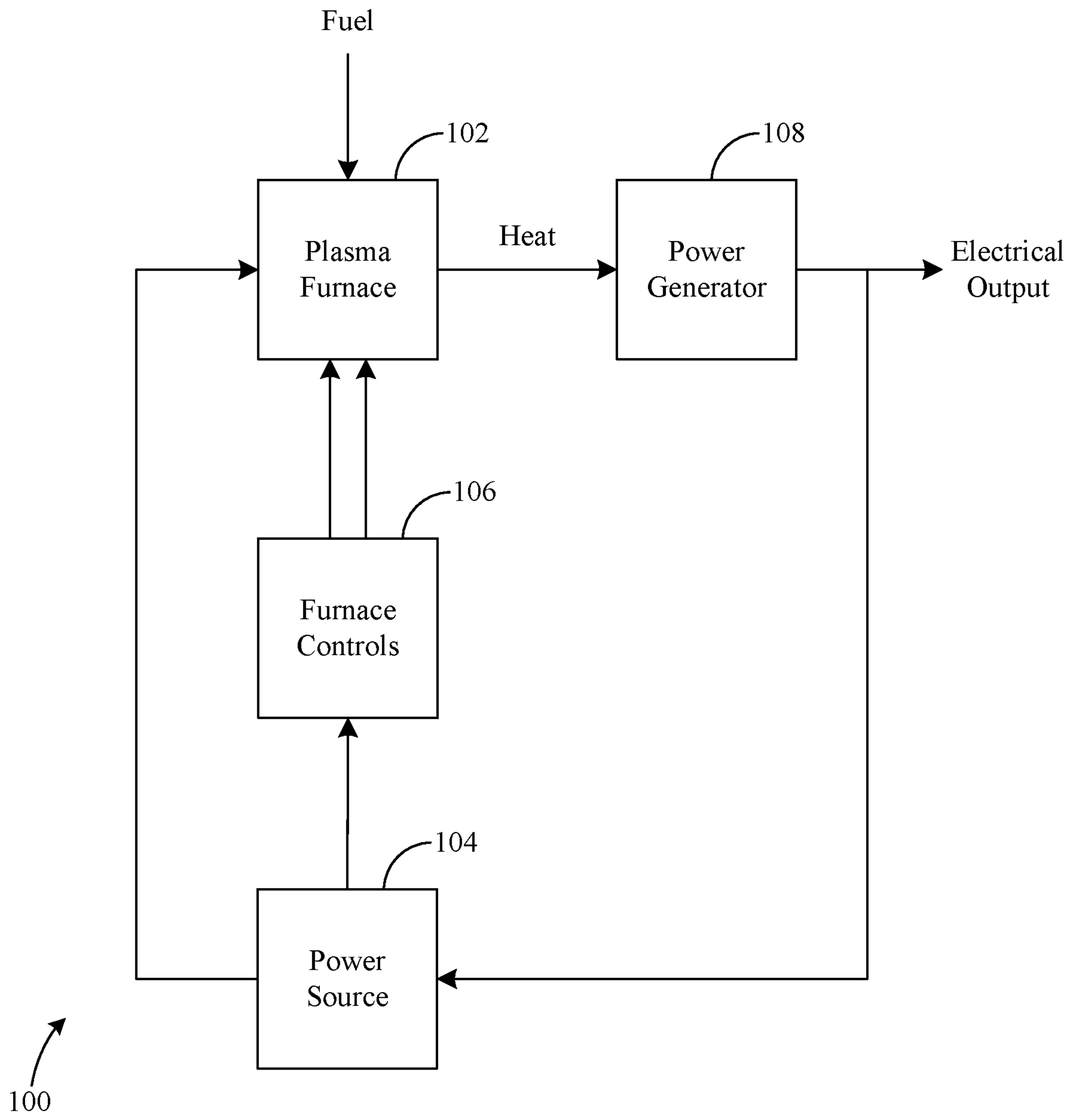
FIG. 1 is a block diagram showing a plasma generating system.

FIG. 1 is a block diagram of a plasma generating system 100. A plasma furnace 102 is powered by an electrical source 104 (e.g. a high-voltage power supply), which is partially managed by furnace controls 106. Furnace controls 106 manage the amount of voltage and/or current that is used by plasma furnace 102. Fuel is also consumed by plasma furnace 102, which then produces excess heat. The excess heat is converted into electrical energy by a power generator 108. The electrical output is used to power other devices, and can be used to supplement or replace power provided by power source 104.

Plasma generating system 100 can be used for a variety of purposes including, but not limited to, generating heat and/or electrical energy, purifying materials (e.g. mining tailings), incinerating garbage or other waste materials (e.g. nuclear waste), and particle acceleration. Plasma generating system 100 can also be used in conjunction with other known systems. For example, the heat generated by plasma generating system 100 can be used in conjunction with a Stirling engine to perform mechanical work.

Figure 2:
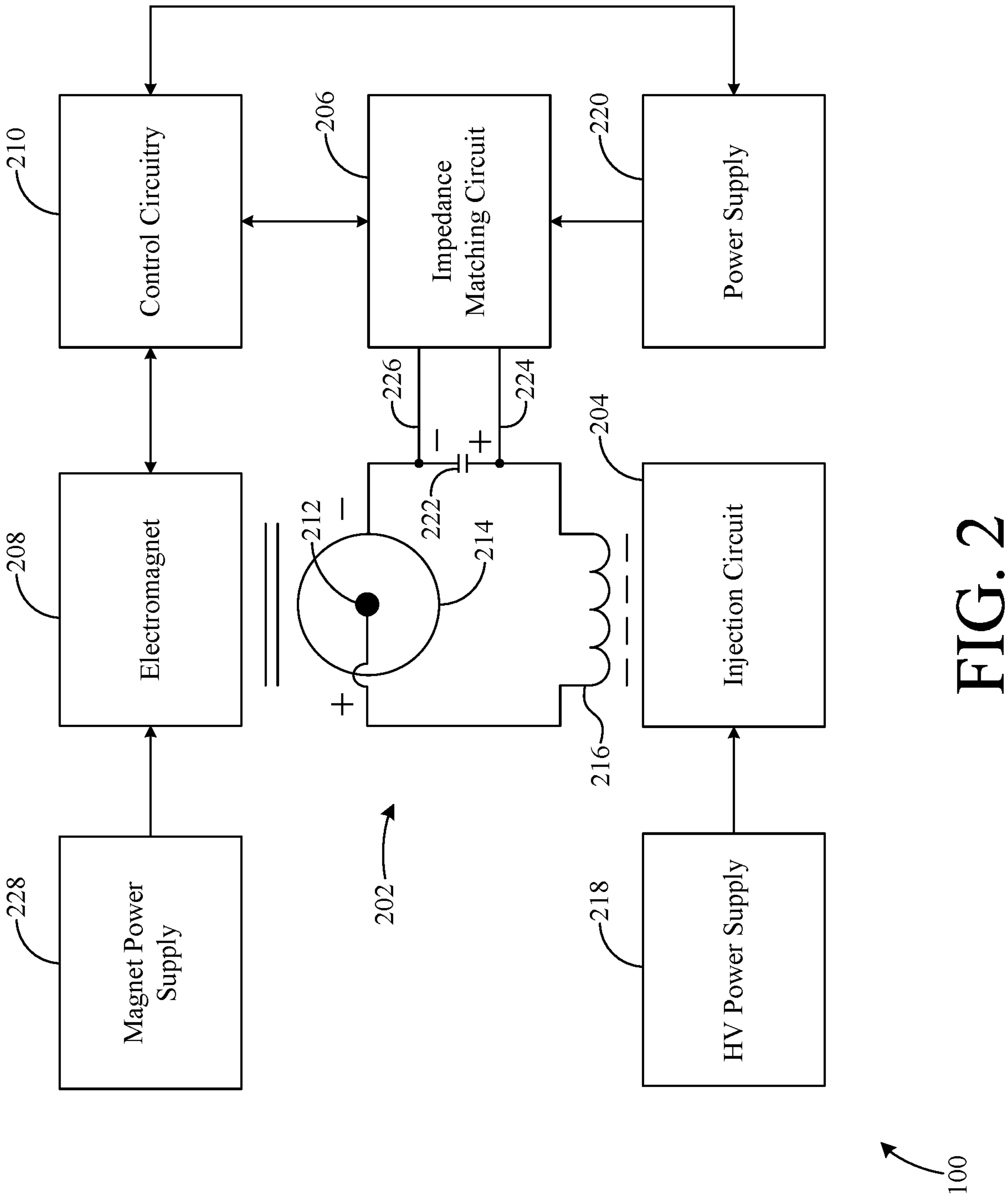
FIG. 2 is a block diagram showing a portion of the plasma generating system of FIG. 1.

FIG. 2 is a block diagram showing a portion of plasma generating system 100. Plasma furnace 102 comprises a plasma generating circuit 202, an injection circuit 204, an impedance matching circuit 206, and an electromagnet 208. Furnace controls 106 comprise control circuitry 210 and power source 104 comprises power supply 220, HV power supply 218, and magnet power supply 228. Plasma generating circuit 202 initiates a plasma with a combination of high voltage and high current electrical energy from injection circuit 204 and impedance matching circuit 206, respectively. Plasma generating circuit 202 includes an inner positive electrode 212 and an outer negative electrode 214, with an air-gap therebetween. The "air-gap" is not necessarily comprised of air and can be comprised of other gases. Negative electrode 214 is an annular conductive element with an inner diameter, in the example embodiment, of approximately twelve inches. Positive electrode 212 is a conductive cylindrical rod suspended at the center of negative electrode 214. The plasma forms in the annular air-gap between electrodes 212 and 214, and rotates about positive electrode 212. The plasma is generated by heating the air-gap between electrodes 212 and 214, by first arcing across the gap with a high voltage and then passing high current electricity across the arc. The high current electricity heats the air. With sufficiently large current, the air is heated enough to create molecular dissociation and ionization, resulting in the creation of a plasma in the air-gap between electrodes 212 and 214.

Figure 15:
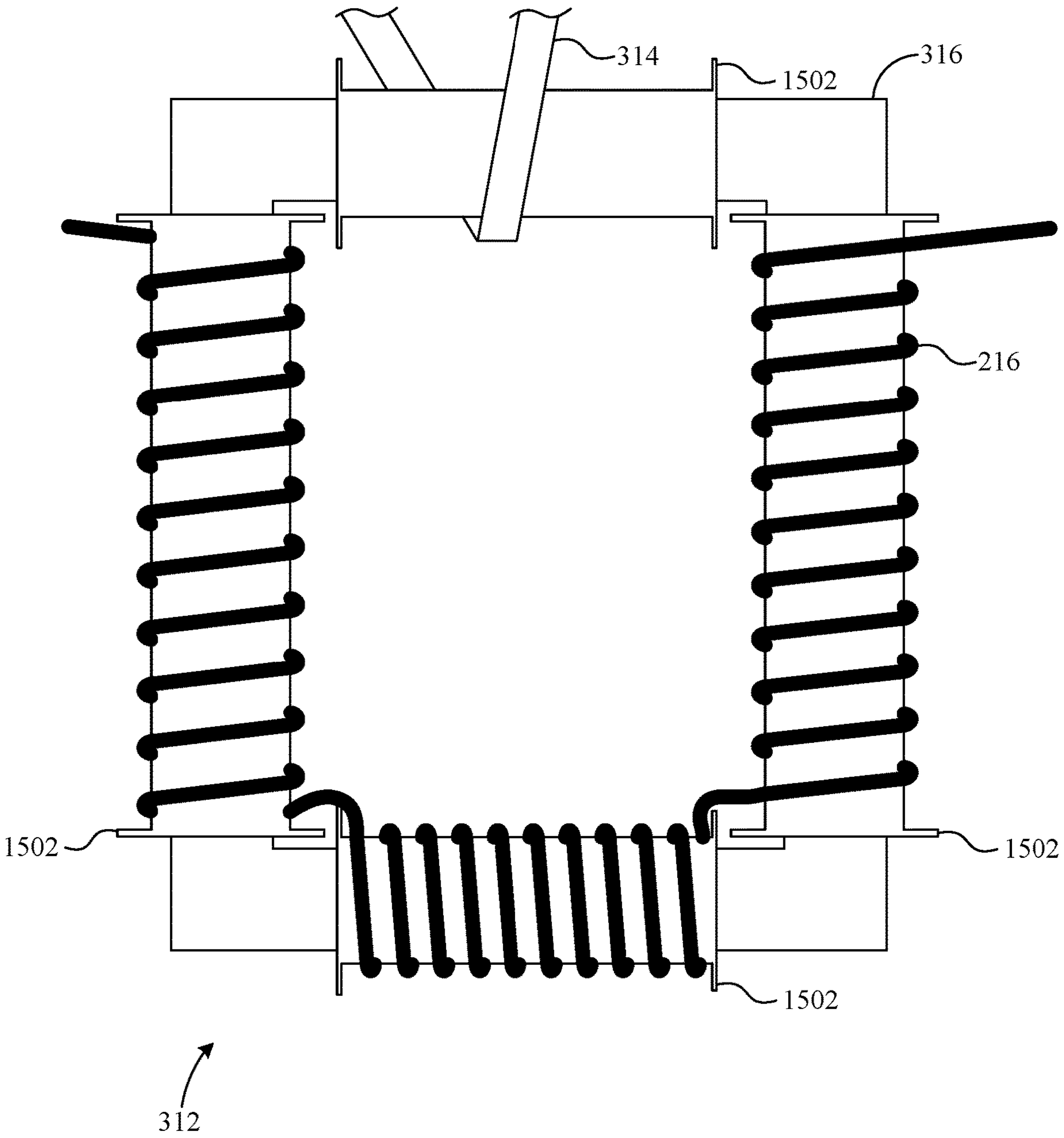
FIG. 15 is a top view showing the transformer of FIG. 3.
Figure 16A:
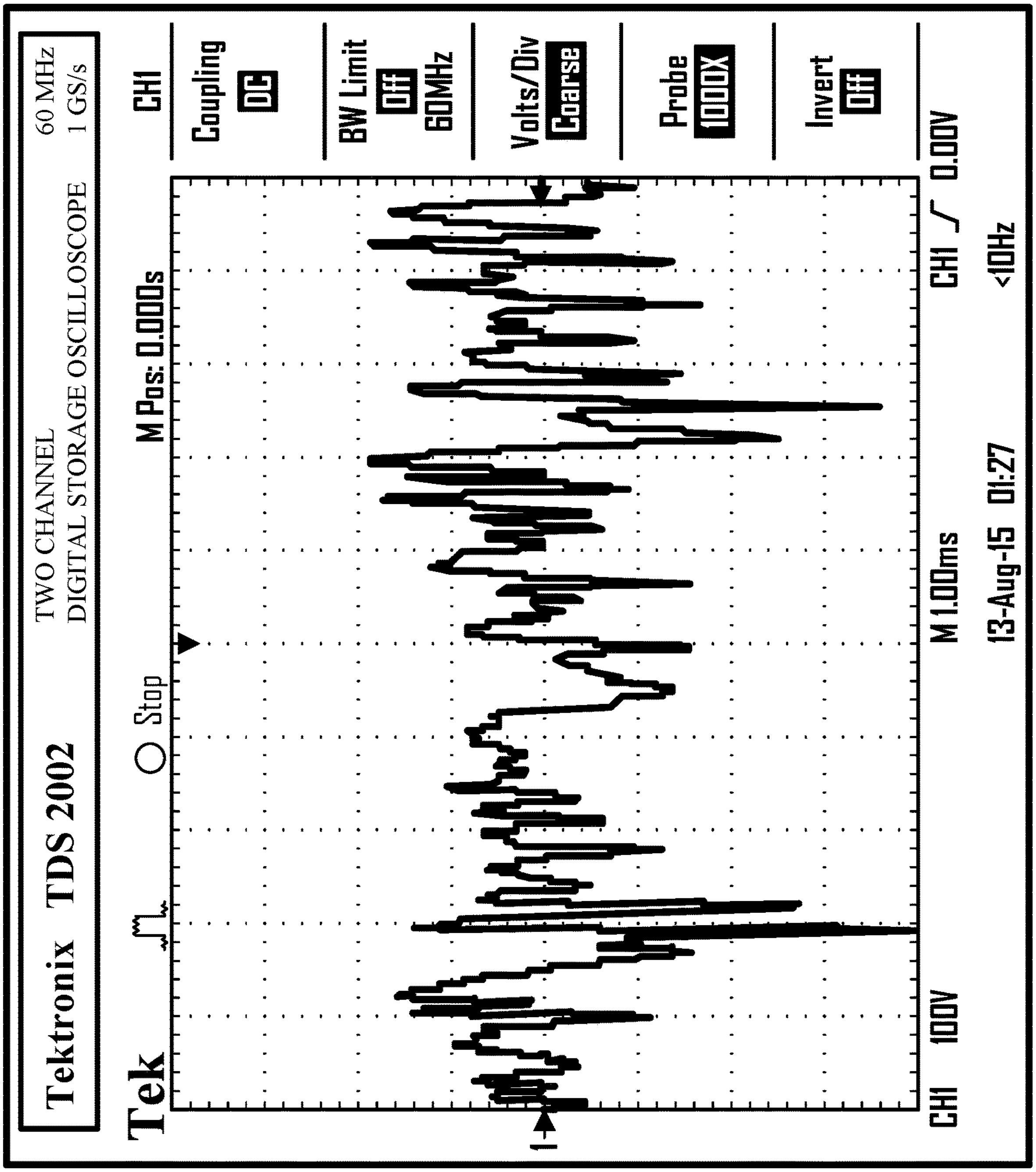
FIG. 16A is a diagram showing an oscilloscope reading of the voltage across the plasma during operation of the plasma generating system of FIG. 1.
Figure 16B:
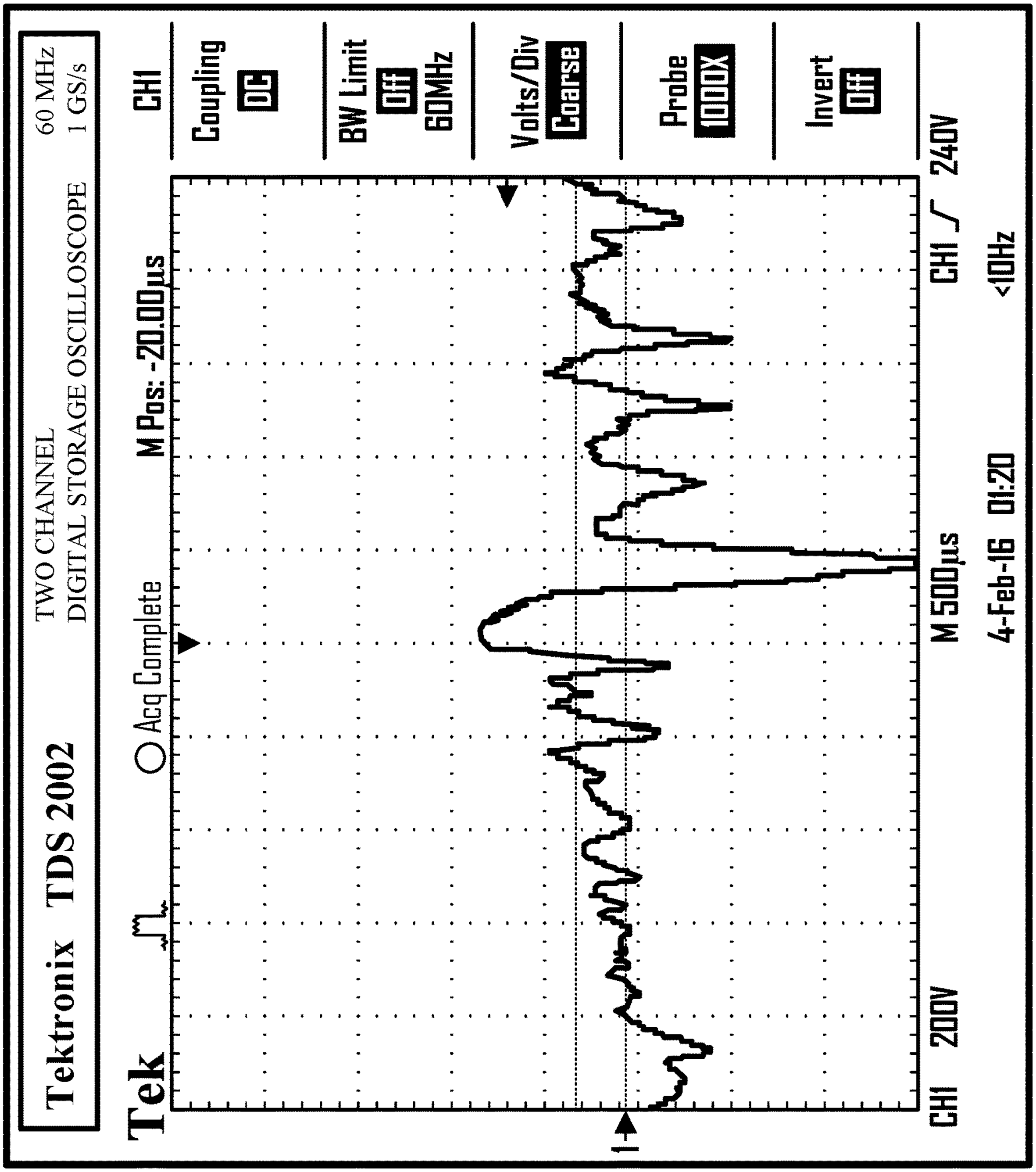
FIG. 16B is a diagram showing another oscilloscope reading of the voltage across the plasma during operation of the plasma generating system of FIG. 1.
Figure 16C:
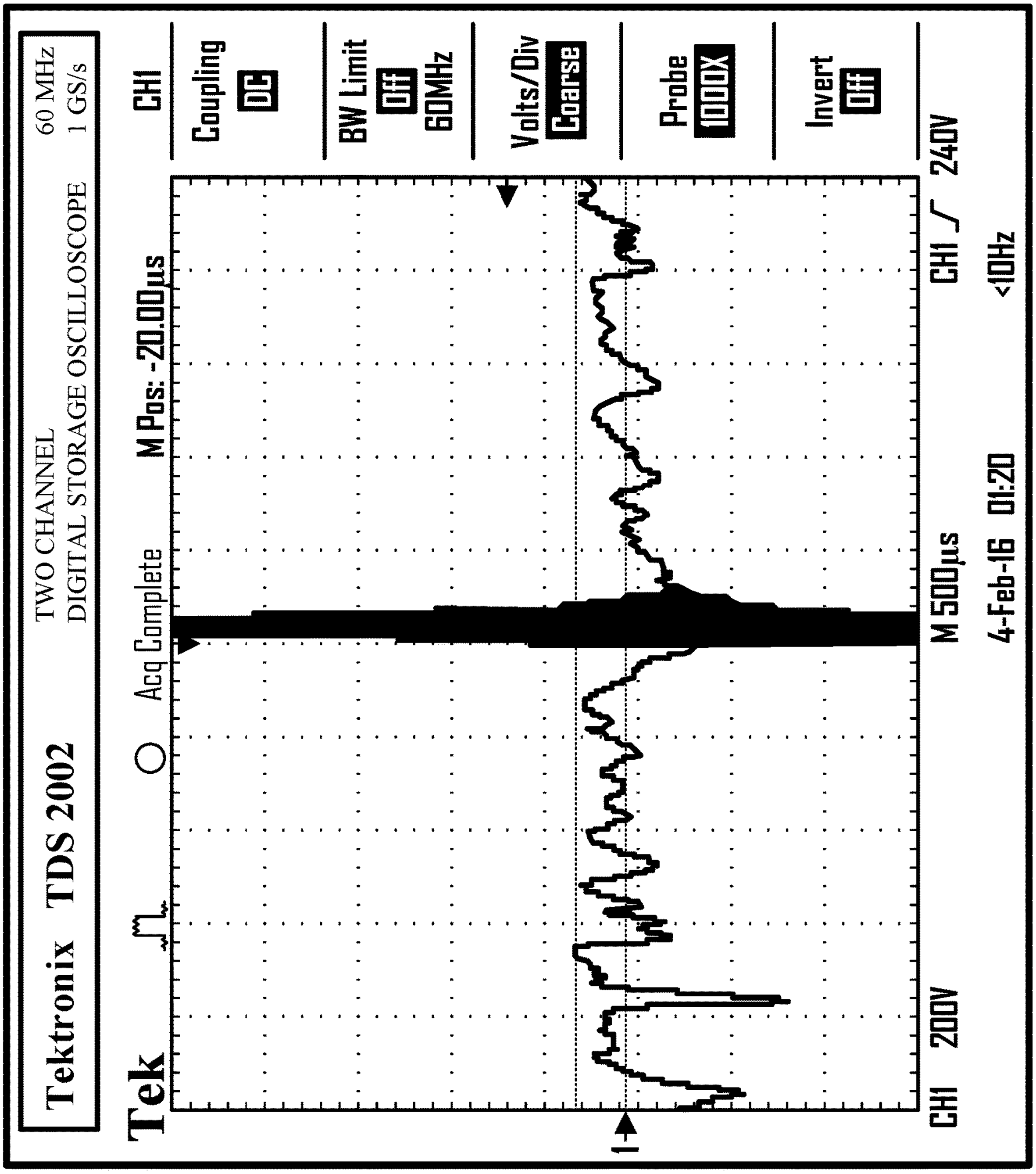
FIG. 16C is a diagram showing yet another oscilloscope reading of the voltage across the plasma during operation of the plasma generating system of FIG. 1.
Figure 16D:
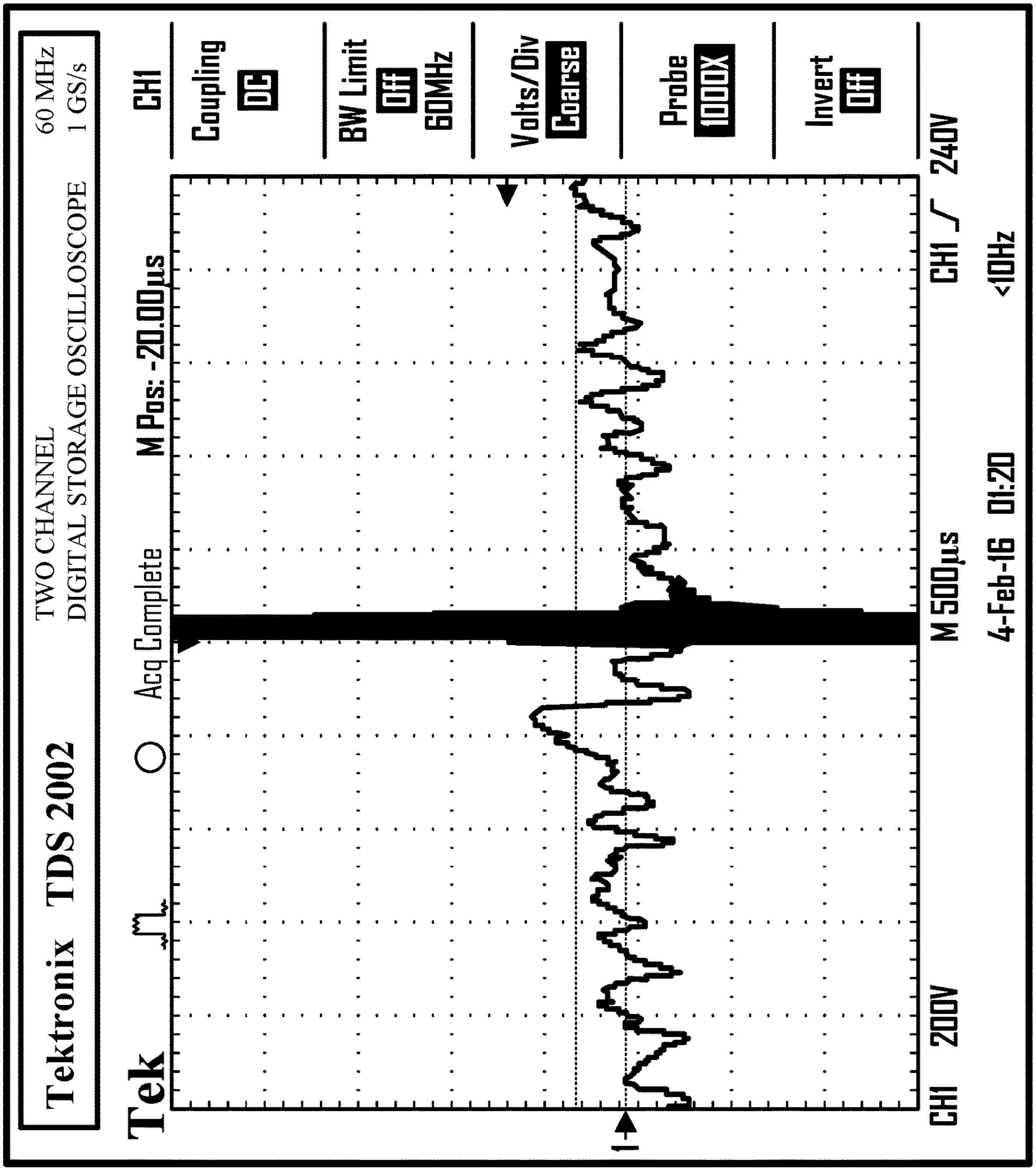
FIG. 16D is a diagram showing another oscilloscope reading of the voltage across the plasma during operation of the plasma generating system of FIG. 1.
Figure 16E:
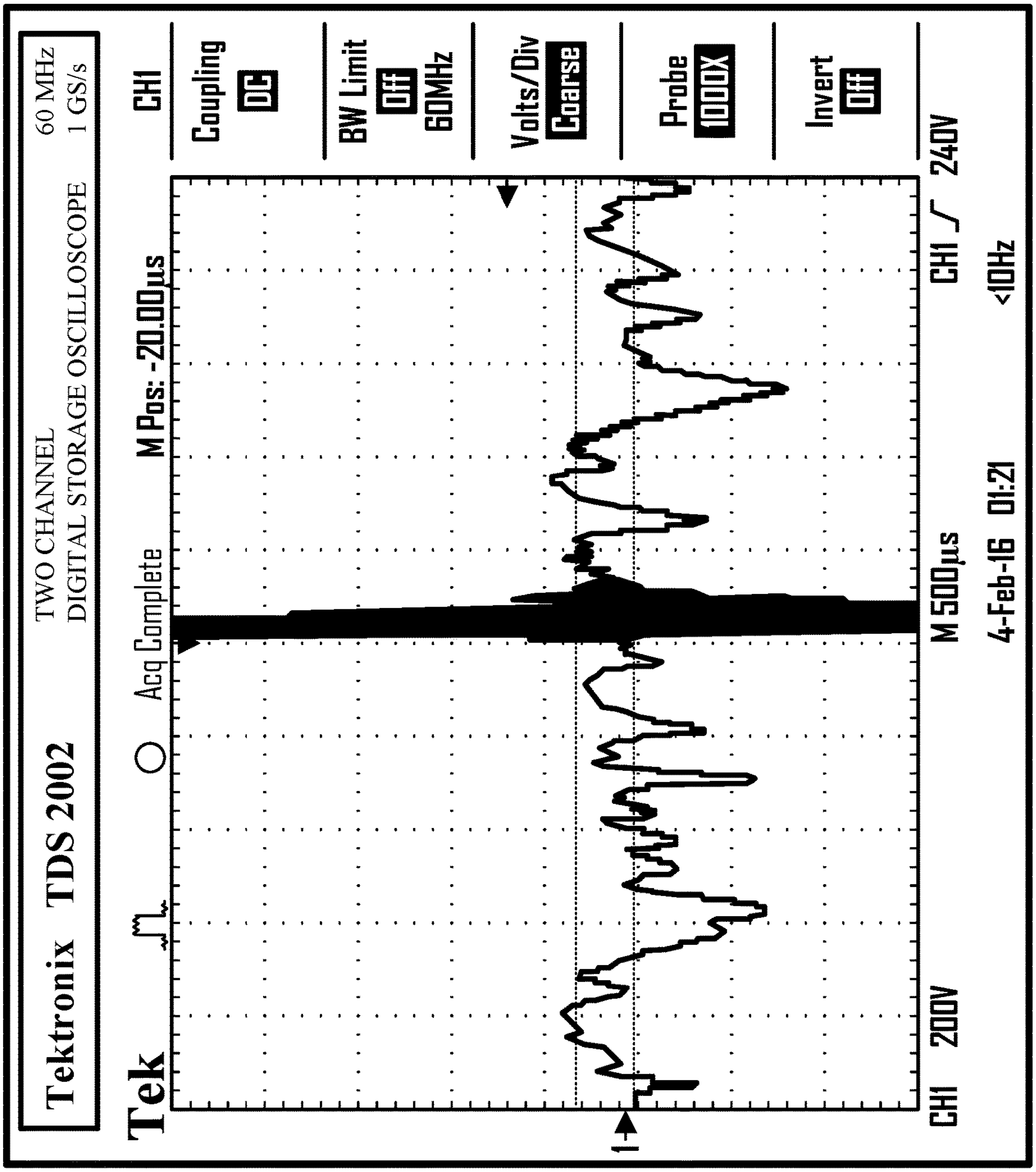
FIG. 16E is a diagram showing yet another an oscilloscope reading of the voltage across the plasma during operation of the plasma generating system of FIG. 1.
Figure 16F:
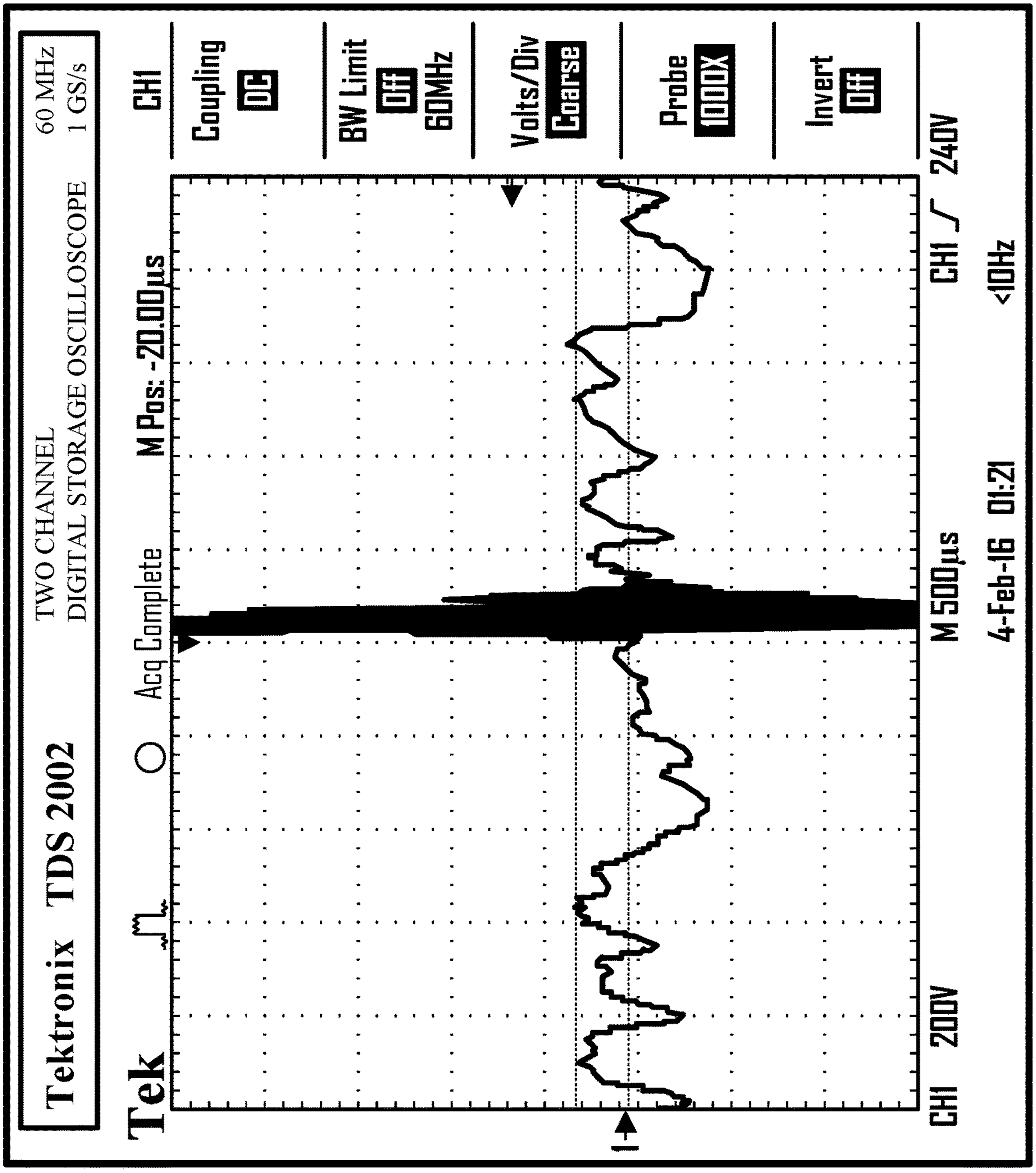
FIG. 16F is a diagram showing another oscilloscope reading of the voltage across the plasma during operation of the plasma generating system of FIG. 1.

The high voltage required to arc across the air-gap between electrodes 212 and 214 is provided by injection circuit 204, which is coupled to plasma generating circuit 202 via a high-voltage transformer (FIG. 15). In this example embodiment, the secondary windings 216 of the high voltage transformer also form a part of plasma generating circuit 202. Injection circuit 204 is coupled to high voltage power supply 218 and asserts high voltage alternating current (AC) on the primary winding (FIG. 15) of the high-voltage transformer. The high voltage AC across the primary winding creates an electro-motive force in secondary windings 216, which results in an even higher AC voltage being produced in plasma generating circuit 202. This voltage is high enough to cause an arc across the air-gap between electrodes 212 and 214, closing the circuit and allowing finer control of the electricity flowing across the gap.

Impedance matching circuit 206 converts 3-phase AC power from power supply 220 into DC power for supplying plasma generating circuit 202 with high current electricity. A capacitor set 222 is connected between a positive terminal 224 and a negative terminal 226 of impedance matching circuit 206. Capacitor set 222 forms a part of plasma generating circuit 202, and is charged by DC power provided by impedance matching circuit 206. When an arc across the air-gap between electrodes 212 and 214 occurs, capacitor set 222, which was previously charged by impedance matching circuit 206, is triggered and releases a high current pulse of electrical energy, which heats the air in the air-gap and ignites the plasma. In addition to charging capacitor set 220, impedance matching circuit 206 also acts as a low pass filter to prevent high frequency electrical energy from flowing back to power supply 220 and destroying it.

A plasma is comprised of individual charged particles and can, therefore, be affected by a magnetic field. Electromagnet 208 produces a magnetic field, which is used to confine the plasma. Magnet power supply 228 provides DC power to electromagnet 208, which comprises conductive windings wrapped around a cylindrical core surrounding the space in which the plasma is contained. Power from power supply 228 is converted into a magnetic field in the region surrounding the plasma. By altering the current/voltage provided to electromagnet 208 by magnet power supply 228, the magnetic field can be altered in a predictable fashion, which allows for precise control of the plasma containment (i.e., the size and shape of the plasma).

Control circuitry 210 monitors and controls impedance matching circuit 206 and electromagnet 208 and receives power from power supply 220. Control circuitry 210 controls the output voltage and current provided to electrodes 212 and 214 from impedance matching circuit 206, based on user input which can be provided manually (e.g. through settings dials) or automatically (e.g. through a computer program). Control circuitry 210 also controls the magnetic containment field by controlling the voltage and current provided from magnet power supply 228 to electro magnet 208. Control circuitry 210 also monitors the temperature of a silicon-controlled rectifier (SCR) bridge of impedance matching circuit 206 (FIG. 4) and the magnetic flux through electromagnet 208. In the case of a loss of magnetic flux, which would indicate the failure of the magnetic field, control circuitry 210 shuts down the system, and the plasma dissipates almost instantaneously. In this and other ways, control circuitry 210 is a safety feature, which can prevent injury and/or damage to plasma furnace 102.

Figure 3:
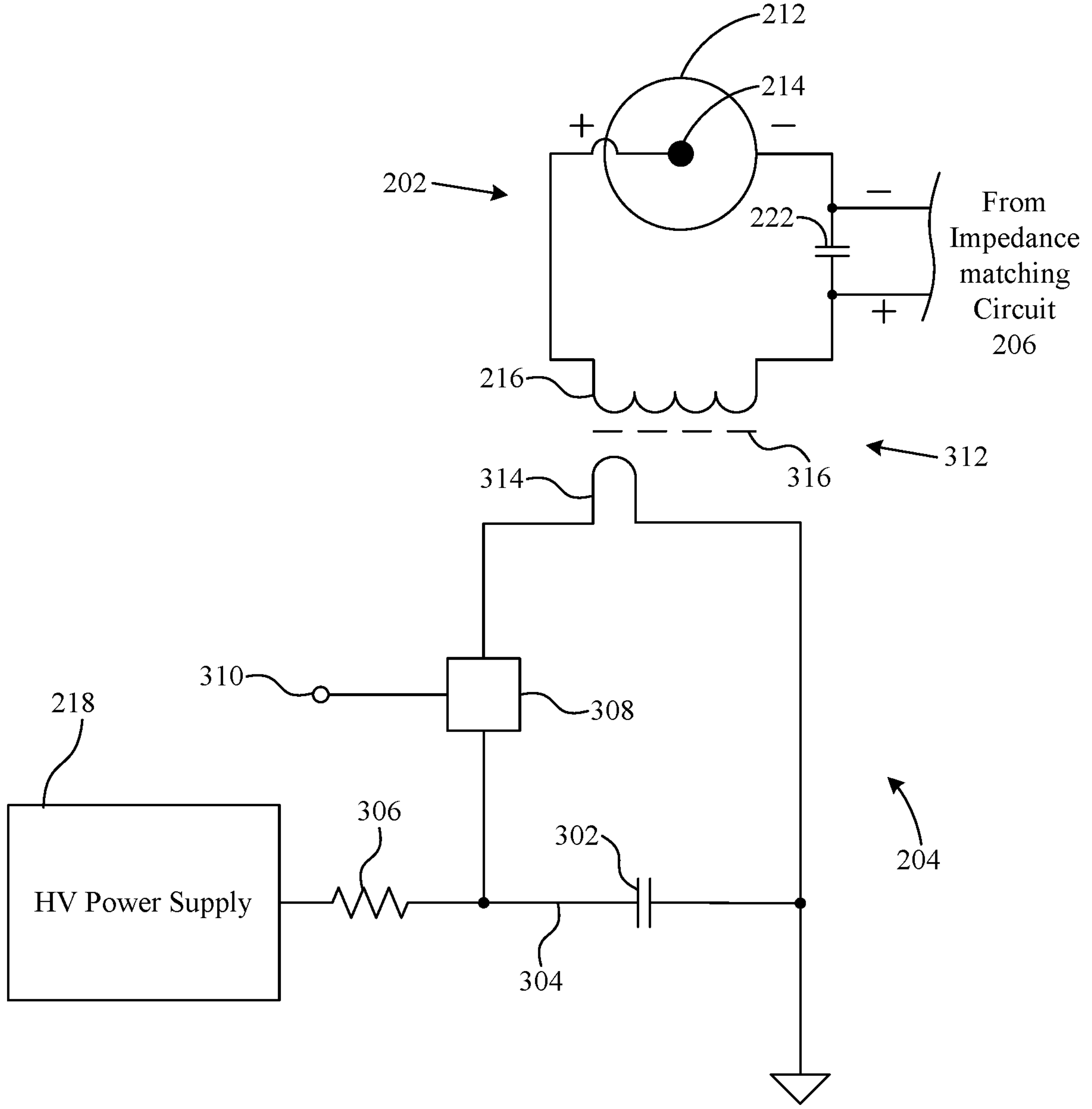
FIG. 3 is a schematic diagram showing the injection circuit of FIG. 2 in greater detail.

FIG. 3 is a schematic diagram showing injection circuit 204 in greater detail and in combination with plasma generating circuit 202 and high voltage power supply 218. To create a high voltage pulse, which is required to ignite the plasma, high voltage power supply 218 charges a capacitor 302 through a first terminal 304, which is electrically coupled to a resistor 306. Resistor 306 prevents dead shorts by maintaining the current and voltage in injection circuit 204 beneath a predetermined maximum. Capacitor 302 is also electrically coupled to a high voltage switch 308, via first terminal 304. When switch 308 is open, capacitor 302 is charged by high voltage power supply 218. When switch 308 is closed by an electrical pulse asserted on a terminal 310, capacitor 302 discharges, providing a high voltage pulse to an injection transformer 312. Transformer 312 is a step-up transformer having one primary winding 314 and 30 secondary windings 216. In the example embodiment, primary winding 314 has an effective inductance of 1 μh, and secondary windings 216 have an effective inductance of 3.27 mh. When the high voltage pulse travels through primary winding 314, it creates magnetic flux in a core 316 of transformer 312. The magnetic flux creates an electromotive force in secondary windings 216, which creates a high voltage electrical current in plasma generating circuit 202. Because there are more of secondary windings 216 than of primary winding 314, the voltage established in plasma generating circuit is higher than the voltage in injection circuit 204. The ratio of the plasma generating voltage to the injection voltage is approximately equal to the ratio of the secondary windings to the primary windings, which, in this embodiment, is 30. (The ratio is less than 30 in practice, because of flux leakage, hysteresis, Joule losses, etc.). This high voltage is sufficient for arcing across the air gap between electrodes 212 and 214, which closes plasma generating circuit 202, allowing for the high current electricity from current power supply 220, via impedance matching circuit 206, to pass between electrodes 212 and 214. In the example embodiment, injection circuit 204 supplies 40 kV at 1 amp to plasma generating circuit 202 and can handle 120 kW of continuous power. Once the plasma is established, injection circuit 204 can discontinue operation, except for secondary windings 216 of plasma generating circuit 202, which continue to conduct operating current from current power supply 220 and impedance matching circuit 206. Alternatively, injection circuit 204 can continue to periodically fire, in case the plasma dissipates and the arc is lost.

Figure 4:
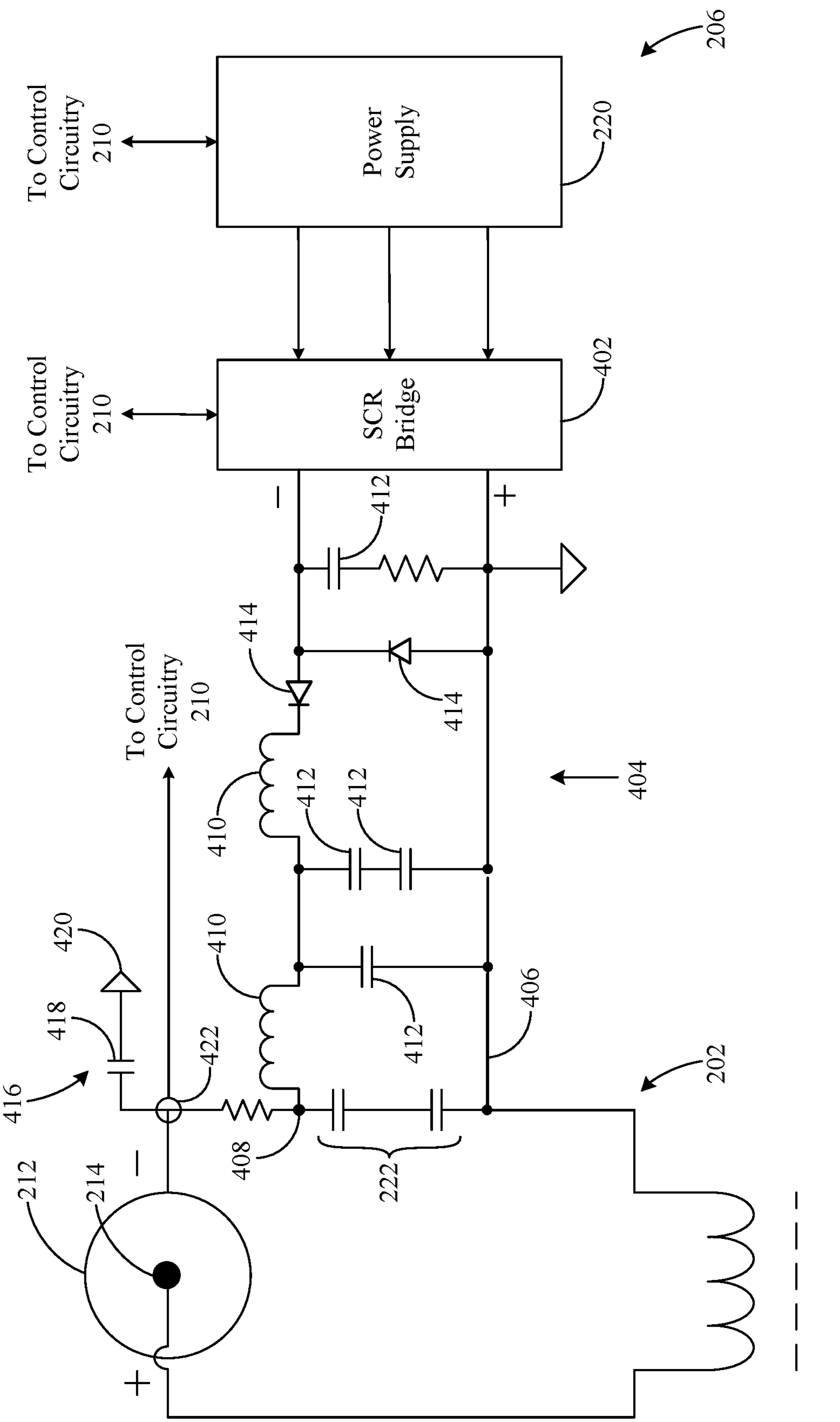
FIG. 4 is a schematic diagram showing the impedance matching circuit of FIG. 2 in greater detail.

FIG. 4 is a schematic diagram showing impedance matching circuit 206 in greater detail and in combination with plasma generating circuit 202 and power supply 220. Impedance matching circuit 206 includes a silicon-controlled rectifier (SCR) bridge 402, and an intermediate circuit 404 electrically connected between SCR bridge 402 and plasma generating circuit 202. SCR bridge 402 converts 3-phase AC power from power supply 220 into DC power for charging capacitor set 222, which is connected between a positive terminal 406 and a negative terminal 408 of intermediate circuit 404. When capacitor set 222 is fully charged, and the air-gap between positive electrode 212 and negative electrode 214 has been arced across, capacitors in capacitor set 222 will discharge, creating a pulse of high current electricity through plasma generating circuit 202. Because the air-gap acts as a resistor, the pulse is sufficient to resistively heat the gas in the air-gap to a temperature sufficient to generate a plasma between electrodes 212 and 214. In the example embodiment, impedance matching circuit 206 supplies 1,000V at 200 amps. A current monitoring loop 422 is electrically coupled to negative electrode 212, to provide current and/or voltage information to control circuitry 210. Control circuitry 210 utilizes this information to alter the control signals sent to various elements of plasma generating system 100.

Intermediate circuit 404 also acts as a low pass filter to prevent damage to SCR bridge 402 and power supply 220, when high frequency current is injected into plasma generating circuit 202 by injection circuit 204 (FIG. 3). Intermediate circuit 404 includes several inductors 410, capacitors 412, and diodes 414. Inductors and capacitors connected in series act as low pass filters (LPFs). Several LPFs connected in parallel form a multistage LPF. These low pass filters help to filter high frequency AC noise that might otherwise damage SCR bridge 402. Diodes 414 act as high frequency switching diodes to prevent reverse bias, which might also damage SCR bridge 402. Additionally, diodes 414 prevent voltages over a predetermined threshold from reaching SCR bridge 402. An additional filter 416 is electrically coupled to plasma generating circuit 202. Filter 416 is simply a capacitor 418 connected to a ground 420. Filter 416 provides additional protection to the other elements of the circuit. Specific example parameters of the electronic elements of impedance matching circuit 206 (as well as other elements of plasma generating system 100) will be provided hereinafter.

Figure 5:
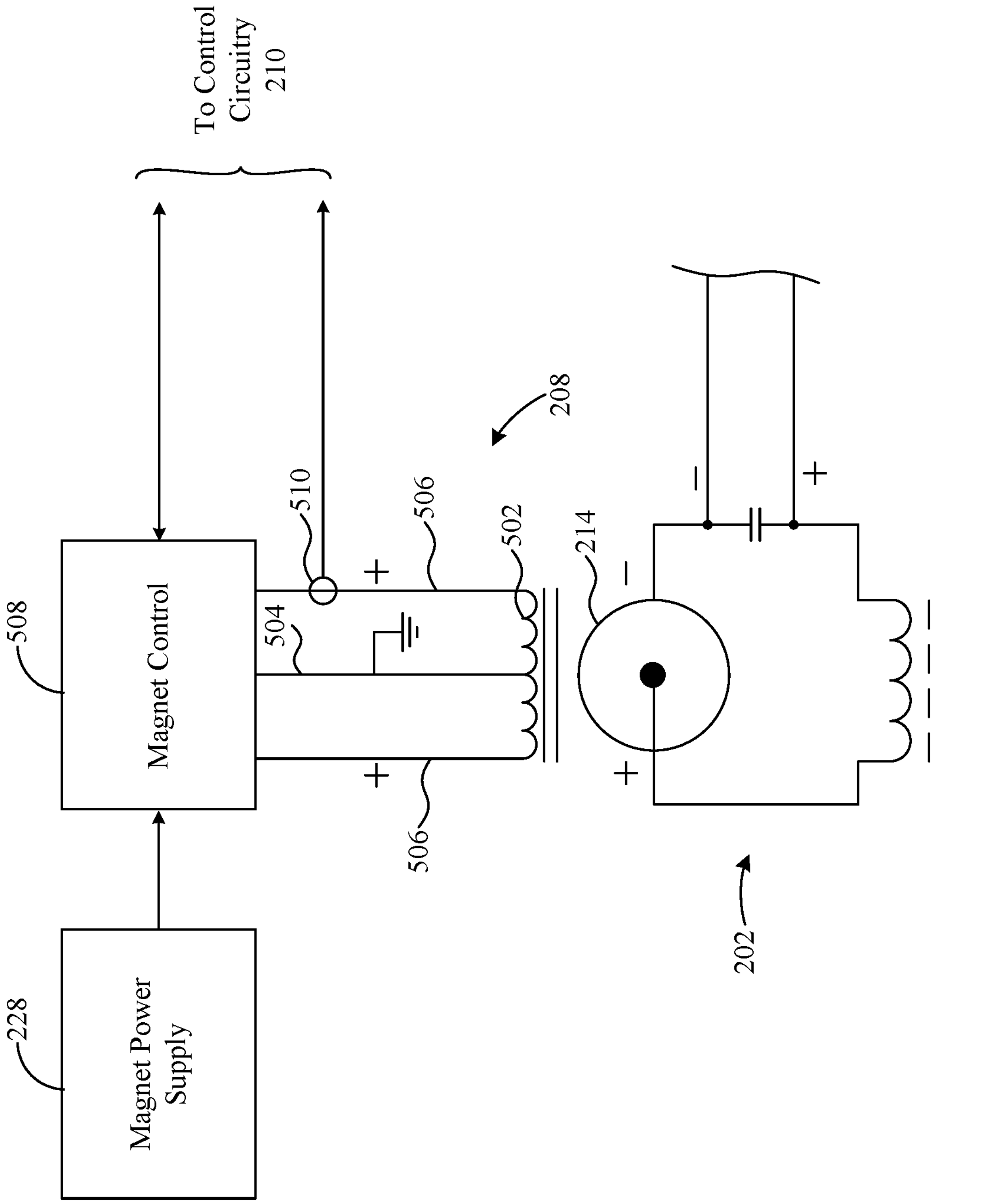
FIG. 5 is a schematic diagram showing the electromagnet of FIG. 2 in greater detail.

FIG. 5 is a schematic diagram showing electromagnet 208 in greater detail and in combination with plasma generating circuit 202 and magnet power supply 228. Electromagnet 208 is comprised of a plurality of conductive windings 502, connected through three leads. One lead is a ground 504 and the other two are positive leads 506. Windings 502 are wrapped around a bobbin disposed around negative electrode 214, which acts as the magnet's core. In the example embodiment, magnet power supply 228 provides 120V AC power at 7.5 amps to a magnet control 508. Magnet control 508 converts the AC power to DC and, responsive to control instructions from control circuitry 210, alters the DC voltage and current through windings 502 accordingly. In the example embodiment, electromagnet 208 is powered by 163V DC current. Additionally, one of positive leads 506 includes a current monitoring loop 510, which provides information about the current and/or voltage through windings 502 to control circuitry 210. If there is insufficient power to contain the plasma, control circuitry 210 will automatically shut down plasma generating system 100.

Electromagnet 208 creates a vertical magnetic field that causes the plasma to rotate. Varying the voltage and current through windings 502 alters the magnetic field. Therefore, rotation of the plasma can be controlled in known ways by controlling electromagnet 208. In addition, the rotating plasma itself generates a magnetic field that further contributes to containment of the plasma. Increasing the voltage and/or current through windings 502 compresses the plasma in the vertical direction (i.e. along the height of negative electrode 214). Additionally, if the polarity of the current is reversed in one of windings 502 or plasma generating circuit 202 (but not both), then the rotation of the plasma will reverse.

The plasma can be controlled in additional ways. By altering the voltage and/or current through plasma generating circuit 202, the rotational velocity of the plasma can be controlled. For example, a lower voltage across the plasma increases the rotational velocity of the plasma, and a higher voltage across the plasma decreases the rotational velocity of the plasma. In addition, decreasing the current across the plasma reduces the velocity of rotation of the plasma. By increasing the current and the voltage across the plasma, the intensity of the plasma (i.e. how hot and dense the plasma is) can be increased without significantly affecting the rotational velocity.

Figure 6:
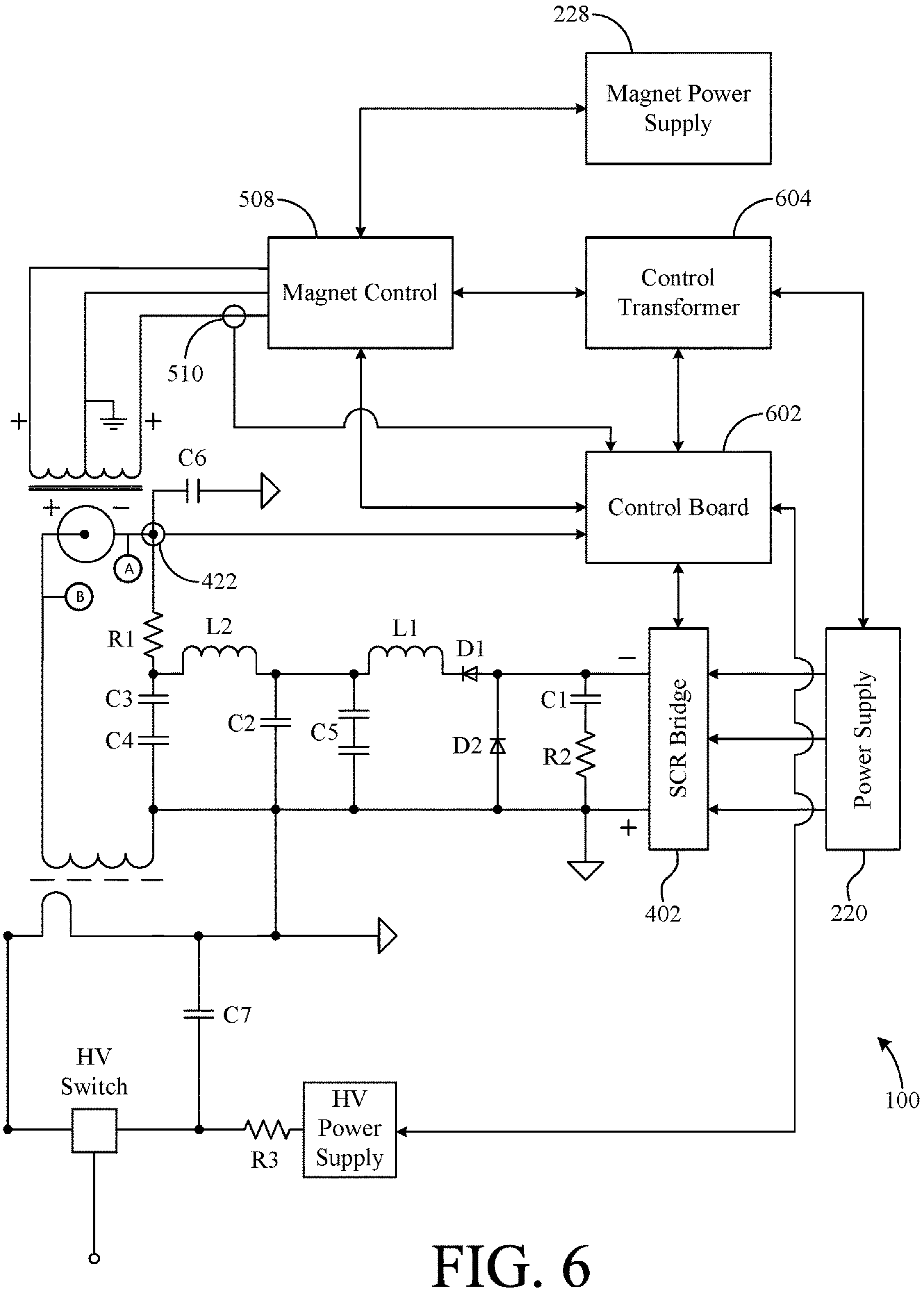
FIG. 6 is a schematic diagram showing the circuitry of the plasma generating system of FIG. 1 in even greater detail.

FIG. 6 is a schematic diagram showing the circuitry of plasma generating system 100 in even greater detail. The elements are labeled with a letter (R=resistor, C=capacitor, L=inductor, and D=diode) and a number to differentiate them from one another. In the example embodiment, the resistors have the following resistances: R1=1.25Ω (rated for 120 kW), R2=47Ω, and R3=1 kΩ. The capacitors have the following capacitances: C1=1.2 μF, C2=0.047 μF, C3=C4=C5=400 μF, C6=1.2 μF, and C7=1.8 μF. The inductors have the following inductances: L1=L2=54.5 μh. Some of these electrical elements have relatively high effective resistances, which causes heat generation when electricity flows through them. Consequently, some of these elements may require thermal regulation. Thermal regulation of common electrical elements is well-known in the art; therefore, a detailed description of the cooling systems associated with the current embodiment is omitted.

Those skilled in the art will recognize that these particular elements (as well as other described elements, even if not explicitly stated) are not essential elements of the present invention. For example, the present invention may be scaled up or down with electronic elements of differing parameters.

FIG. 6 also illustrates control circuitry 210 in greater detail. Control circuitry 210 comprises a control board 602, a control transformer 604, and magnet control 508. Control board 602 is an interface between an operator (human or software) and the electrical components of plasma generating system 100. Control board 602 is powered by control transformer 604, which converts AC power having a particular voltage from power supply 220 into power having the appropriate voltage and current for use by control board 602. Control board 602 provides control instructions to HV power supply 218, SCR bridge 402, and magnet control 508 and receives operational data from current monitoring loops 422 and 510, which provide information regarding the current and/or voltage across the plasma and electromagnet 208, respectively. Based on this information, control board 602 can send control instructions for increasing/decreasing power to intermediate circuit 404, increasing/decreasing power to injection circuit 204, and/or increasing/decreasing power to electromagnet 208, as needed.

Magnet control 508 controls electromagnet 208, based on control signals received from control board 602. Magnet control 606 receives power from magnet power supply 228 and, based on control instructions received from control board 602, applies a voltage differential onto windings 502. The voltage differential applied determines (at least partially) the current through windings 502 and, therefore, the strength of the magnetic field containing the plasma. The voltage differential can be tuned for various results, such as compressing the plasma or changing the rotational rate/direction of the plasma.

Additionally, FIG. 6 shows two terminals, labeled “A” and “B” electrically coupled to negative electrode 214 and positive electrode 212, respectively. These terminals can be used to monitor the current and/or voltage across the plasma in real time. The current and/or voltage can be connected to monitor for viewing by an operator. Alternatively, the terminals may be coupled to a programmable logic controller (PLC) for automated monitoring. The PLC can also be coupled to control circuitry 210 for altering control parameters as a direct response to currents and/or voltages across electrodes 214 and 212 that are not within a predefined operating range. Additionally, the PLC can be used to turn off injection circuit 204 after the plasma is generated, based on current and/or voltage readings from current monitoring loop 422.

Figure 7:
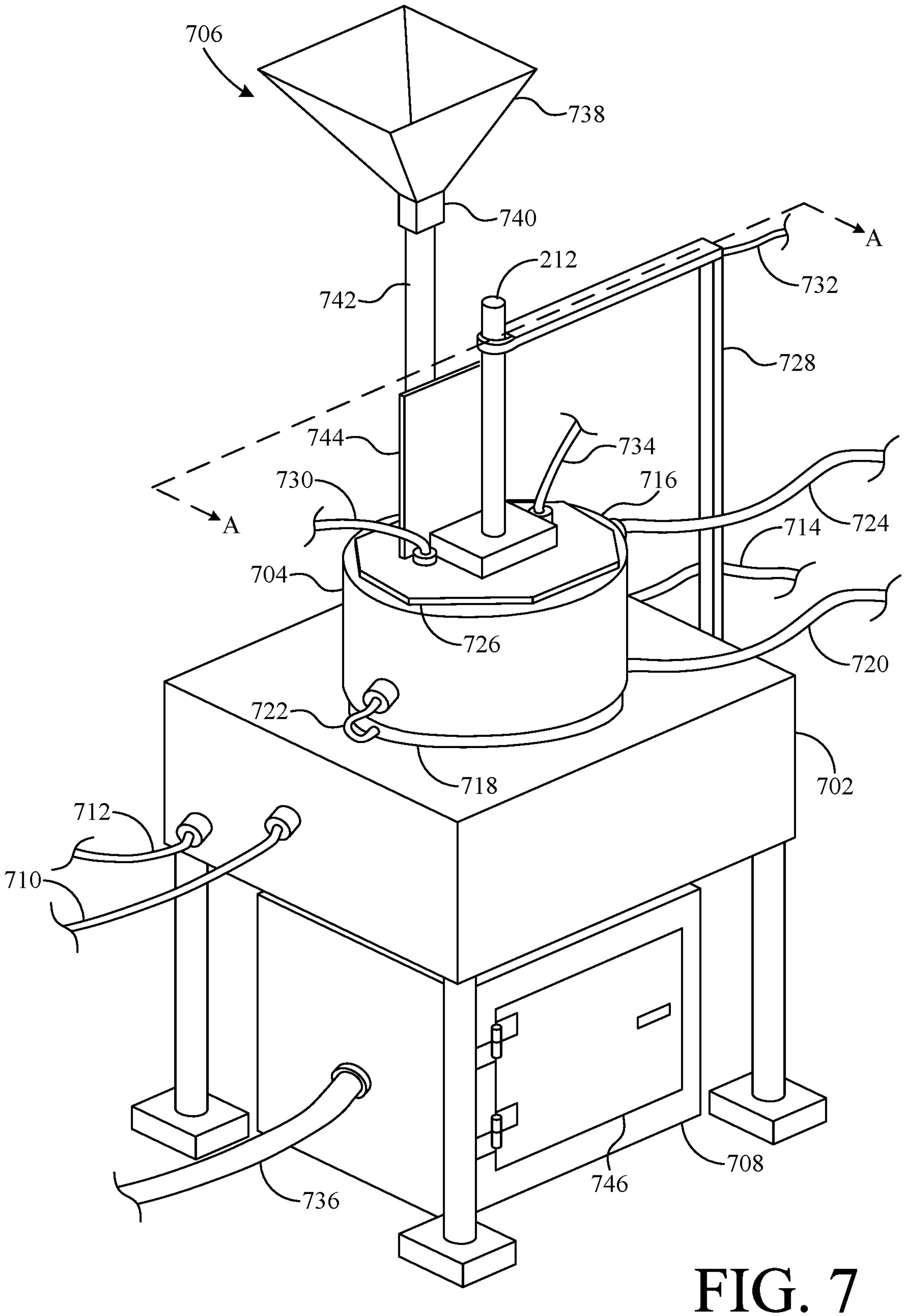
FIG. 7 is a perspective view showing an example physical embodiment of the plasma furnace of FIG. 1.

FIG. 7 is a perspective view of a physical embodiment of plasma furnace 102, including a magnet containment box 702, a containment sleeve 704, a fuel feed system 706, and a spent fuel store 708. Magnet containment box 702 houses windings 502 of electromagnet 208 (FIG. 5). A magnet cable 710 runs between containment box 702 and magnet control 508 and insulates leads 504 and 506. A coolant inlet 712 and a coolant outlet 714 are also connected to box 702 and allow coolant (e.g. thermal fluid) to flow through box 702 to cool windings 502 while electromagnet 208 is operating. Coolant inlet 712 and coolant outlet 714 are also coupled to a coolant pump, a radiator, and radiator fans (FIG. 9) for dispersing heat.

Containment sleeve 704 is disposed partially inside of box 702, and also houses negative electrode 214. Containment sleeve 704 includes an upper cooling sleeve 716 and a lower cooling sleeve 718. A coolant inlet 720 is coupled to lower cooling sleeve 718, an intermediate coolant tube 722 is coupled between lower cooling sleeve 718 and upper cooling sleeve 716, and a coolant outlet 724 is coupled to upper cooling sleeve 716. Coolant enters lower cooling sleeve 718, passes between lower cooling sleeve 718 and upper cooling sleeve 716, and exits upper cooling sleeve 716 to maintain a preferred temperature of system 100 during operation. The coolant is pumped into lower cooling sleeve 718 by a coolant pump (FIG. 9), which is connected to a coolant reservoir. The coolant reservoir is connected to a radiator for dispersing heat. Alternatively, the radiator can be submerged in water for generating steam.

Containment sleeve 704 also includes a ceramic lid 726. Positive electrode 212 is suspended in the center of containment sleeve 704 through an opening in ceramic lid 726 by a stand 728. A conductive wire 730 disposed within a hole in ceramic lid 726 electrically couples negative electrode 214 to plasma generation circuit 202 (FIG. 2). Another conductive wire 732 electrically couples positive electrode 212 to plasma generation circuit 202 via stand 728. Additionally, a gas hose 734 is disposed within another hole in ceramic lid 726 and is connected to a compressor (not shown) to generate gas flow through containment sleeve 704 during operation of plasma furnace 102. A variety of gases can be used, including, but not limited to, air, nitrogen, argon, hydrogen, and mixtures thereof. Plasma furnace 102 is capable of operating with any oxygen potential (i.e. oxidizing, reducing, or inert gas conditions). Gas flow through containment sleeve 704 can help prevent oxidation of interior parts of plasma furnace 102, if a sufficiently low oxygen potential is achieved. Exhaust flows out of spent fuel store 708 through an exhaust pipe 736, which is coupled to an exhaust scrubber (not shown). The exhaust is processed to filter out potential contaminants and/or potentially useful gases.

Fuel feed system 706 includes a trough 738, a feeder 740, and a chute 742. Trough 738 holds powdered fuel and narrows toward the bottom to direct the powdered fuel toward feeder 740. Feeder 740 is coupled to the bottom of trough 738. Feeder 740 is, for example, an auger feeder that controls the rate at which powdered fuel enters chute 742. Chute 742 is coupled to the bottom of feeder 740 and extends through lid 726 and into containment sleeve 704. A ceramic shield 744 is disposed between chute 742 and positive electrode 212 to prevent electrical arcing between the two. Powdered fuel is fed through chute 742 and into the plasma at a predetermined rate, which is maintained by feeder 740. Adding fuel to the plasma increases the temperature of the plasma, but the size and/or rotation of the plasma is maintained by electromagnet 208. The powdered fuel is consumed by the plasma, creating excess energy. One benefit to the ability to utilize powdered fuel is the elimination of sintering or agglomeration with binders. In some potential applications, binders are a source of impurities.

Spent fuel store 708 captures spent fuel as it falls out of the plasma. Spent fuel can be accessed through a door 746 for removal. Alternatively, spent fuel can be directed into a funnel or other collection device and directed into another room, deposited on a conveyor to be transported back into trough 738 for reuse, etc.

Figure 8:
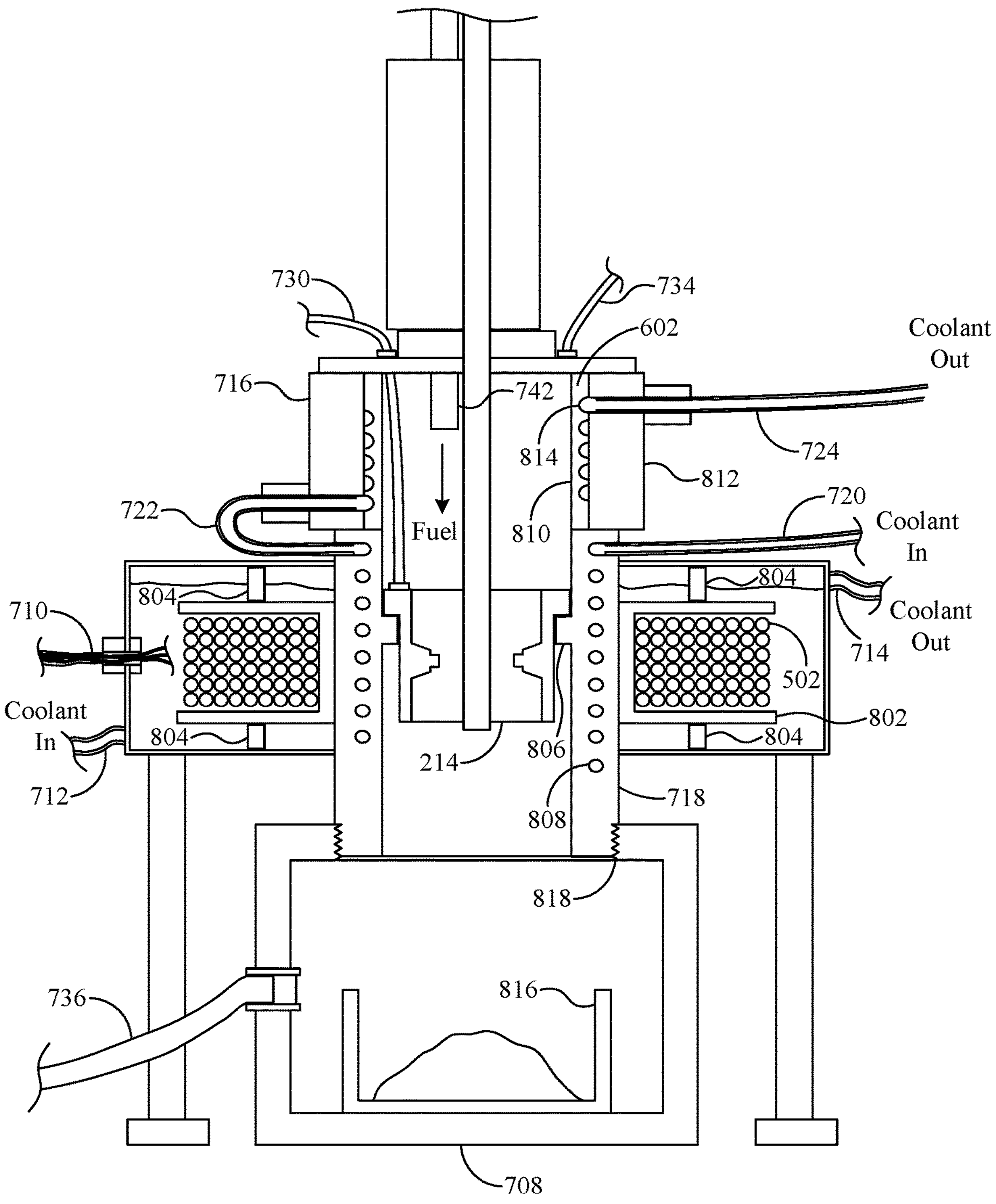
FIG. 8 is a sectional view, taken along line A-A, showing the plasma furnace of FIG. 7.

FIG. 8 is a sectional view of plasma furnace 102, taken along line A-A of FIG. 7. Magnet containment box 702 contains windings 502 wrapped around an aluminum bobbin 802 and electrically coupled to magnet cable 710. Aluminum bobbin 802 is insulated from containment box 702 by a set of ceramic standoffs 804. Containment box 702 is partially filled with coolant, which is pumped in through inlet 712. The coolant is maintained at a predetermined level by outlet 714, which allows excess coolant to flow out of containment box 702, when the level of coolant surpasses the level of outlet 714.

Containment sleeve 704 extends into containment box 702. Lower cooling sleeve 718 is open on the inside, and includes a lip 806 for supporting negative electrode 214. Lower cooling sleeve 718 also includes an internal helical passage 808, through which coolant travels and cools the inner bore of lower cooling sleeve 718 and negative electrode 214. Upper cooling sleeve 716 is also open on the inside and has the same internal diameter as lower cooling sleeve 718. Additionally, upper cooling sleeve 716 includes an inner section 810 and an outer section 812. Inner section 810 includes an external helical passage 814, which is sealed when inner section 810 is disposed inside outer section 812. Coolant enters lower cooling sleeve 718 through coolant inlet 720, travels down and back up through helical passage 808, enters intermediate coolant tube 722, enters upper cooling sleeve 716, travels up through helical passage 814, and exits through coolant outlet 724.

Chute 738 extends into the inside of upper cooling sleeve 716. Fuel drops from chute 738 and into the plasma. Alternatively, fuel can be introduced into the plasma by way of feeding a solid rod of fuel into the plasma. When the fuel is spent it falls into the open top of spent fuel store 708 and into a pan 816. Containment sleeve 704 is coupled to spent fuel store 708 by a threaded region 818.

Figure 9:
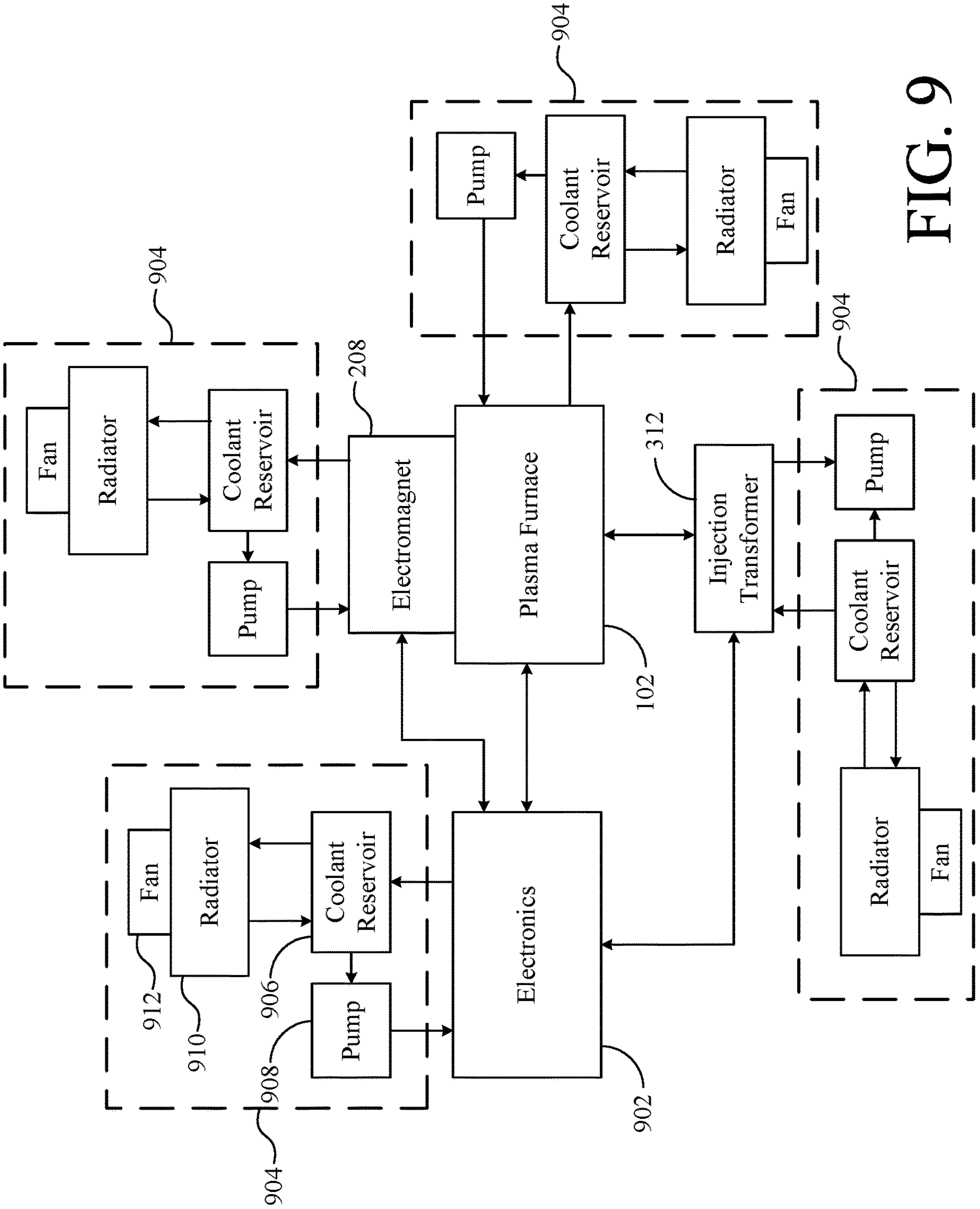
FIG. 9 is a block diagram showing a system for thermal regulation of elements of plasma generating system 100.

FIG. 9 is a block diagram showing a system for thermal regulation of elements of plasma generating system 100. Each of plasma furnace 102, electromagnet 208, electronics 902 (including control circuitry 210, HV power supply 218, power supply 220, and magnet power supply 228), and injection transformer 312 are coupled to a coolant system 904. Each of coolant systems 904 include a coolant reservoir 906, which holds coolant, such as water, thermal fluid, etc., a pump 908, and a radiator 910, interconnected via coolant lines 912. Coolant systems 904 circulate coolant through the connected elements of plasma generating system 100 and extract excess heat generated thereby. Pumps 908 pump coolant from coolant reservoirs 906 through coolant lines of the connected elements and back into coolant reservoirs 906. Coolant reservoirs 906 are connected to radiators 910, through which heated coolant is circulated. The heated coolant exchanges heat with radiators 910, which are coupled to fans 914. Fans 914 distribute the heat into the surrounding air. Heat dissipation is well-known in the art; therefore, a detailed description of the elements of coolant systems 904 is omitted.

Figure 10A:
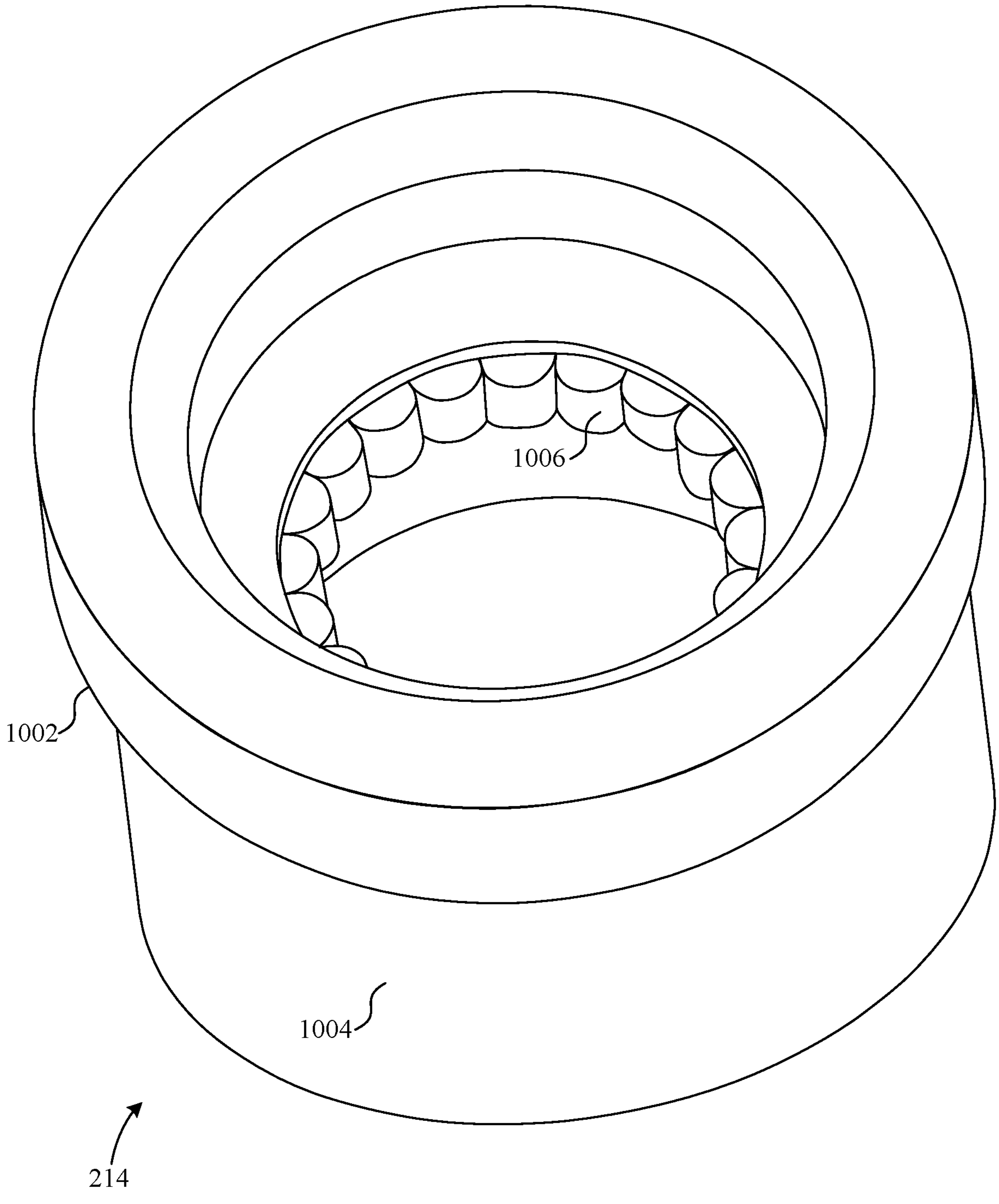
FIG. 10A is a perspective view showing the negative electrode of FIG. 8.

FIG. 10A is a perspective view showing negative electrode 214, which includes an external lip 1002 operative to engage lip 806 of lower cooling sleeve 718. A body portion 1004 of electrode 214 is constructed of stainless steel, and an arcing portion 1006 is made of tungsten. In this embodiment, slices of tungsten rod are fixed into body portion 1004. Alternatively, arcing portion 1006 can be formed of graphite or any other suitable material. The slices of tungsten rod forming arcing portion 1006 have a smaller radius than body portion 1004 to facilitate electrical arcing at lower voltages.

Figure 10B:
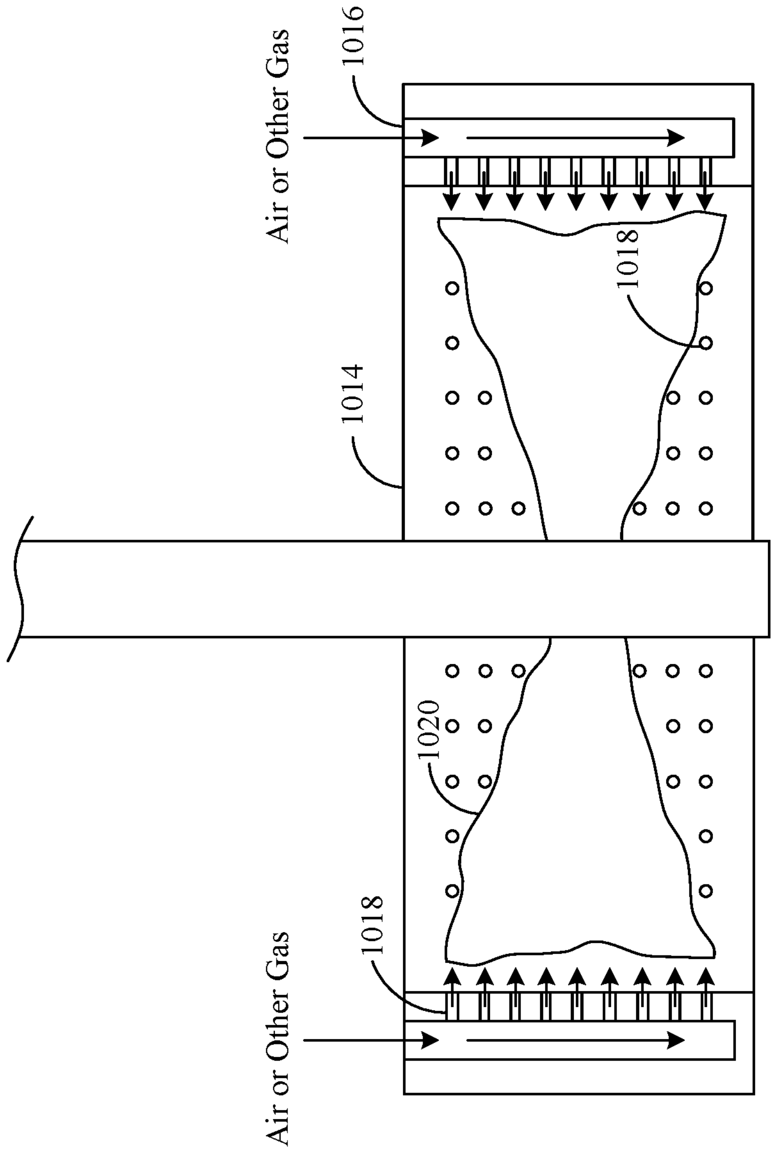
FIG. 10B is a sectional view showing an alternate negative electrode.

FIG. 10B is a sectional view showing an alternate negative electrode 1014. Negative electrode 1014 includes a plurality of passages 1016, which receive, for example, pressurized air from an external source (e.g. an air compressor). Passages 1016 communicate with a plurality of Ports 1018. Pressurized air travels into passages 1016 and through ports 1018, creating a cushion of air between negative electrode 1014 and a plasma disc 1020, protecting negative electrode 1014 from heat damage. Additionally, gasses other than air can be used. For example, helium, argon, and hydrogen gases, and mixtures thereof, have all been successfully used. One advantage of using alternate gases, such as argon, which is inert, is the avoidance of oxidation of the electrode, which can occur in the presence of oxygen.

Figure 11A:
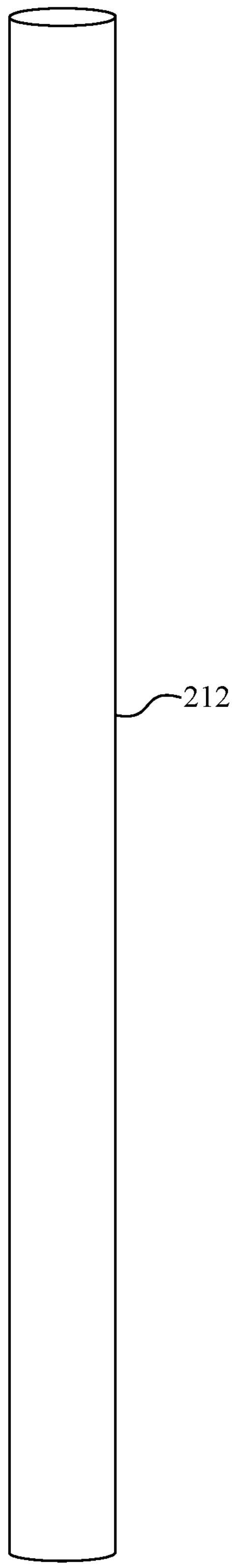
FIG. 11A is a perspective view showing the positive electrode of FIG. 7.

FIG. 11A is a perspective view showing positive electrode 212. In the example embodiment, positive electrode 212 is a conductive, cylindrical rod. In the example embodiment, positive electrode 212 is a tungsten rod. Tungsten is a suitable material, because it is conductive and also resists vaporization and oxidation. In alternate embodiments, carbon (e.g., graphite) can be used, as well as other conductive materials. If positive electrode 212 doubles as the fuel source, the material used need not be resistant to vaporization or oxidation. Instead, electrode 212 is fed into the plasma at a rate equal to consumption.

Positive electrode 212 and arcing portion 1006 of negative electrode 214 can, but need not be, made of the same material. For example, both can be formed of carbon, both can be formed of tungsten, or either one can be formed of carbon and the other can be formed of tungsten or any other suitable material.

Figure 11B:
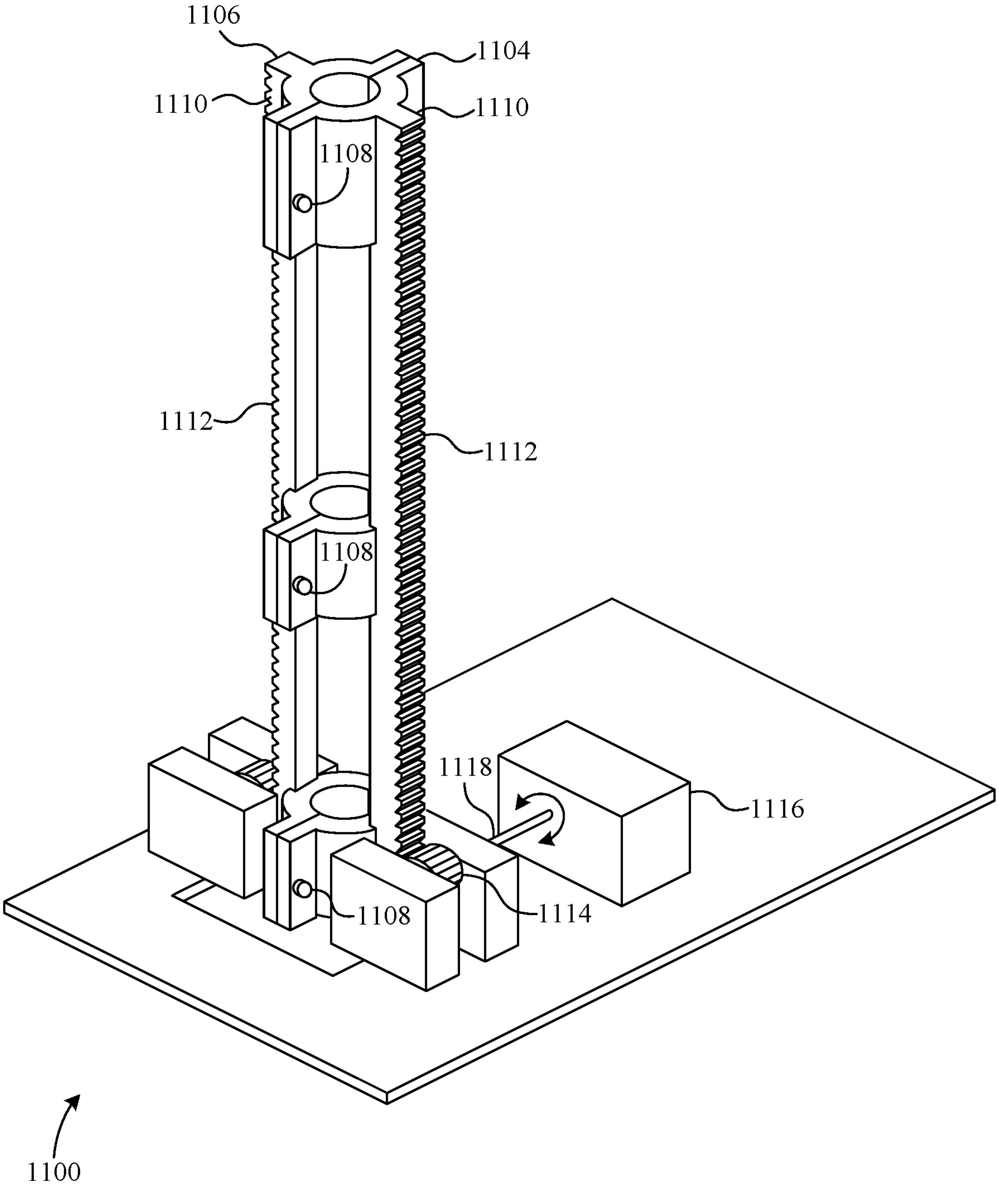
FIG. 11B is a perspective view showing an example embodiment of a rod-feeder for use with the plasma generating system of FIG. 1.

FIG. 11B is a perspective view showing an example rod-feeder 1100, for optional use with plasma generating system 100. Rod-feeder 1100 is configured to feed a fuel rod (not shown) into the plasma at a fixed rate to be consumed. Rod-feeder 1100 includes a rod-holder 1102, configured to grip the fuel rod and hold it in a fixed position. Rod-holder 1102 includes a first portion 1104 and a second portion 1106, which are held together by screws 1108. First portion 1104 and second portion 1106 are substantially similar, except that they are mirror images of one another. The fuel rod is positioned between first portion 1104 and second portion 1106 before screws 1108 are positioned and tightened to provide a tight squeeze on the fuel rod. Both of first portion 1104 and second portion 1106 include a rack 1110 with teeth 1112. Teeth 1112 are adapted to engage a pinion 1114. Pinion 1114 is rotated by a motor 1116 via a drive shaft 1118. When pinion 1114 is driven in one direction, rod-holder 1102 (and the fuel rod) is driven downward, and, when pinion 1114 is driven in the opposite direction, rod-holder 1102 is driven upward. By setting a predefined speed for motor 1116, the fuel rod can be fed into the plasma at a constant rate, equal to the rate at which it is consumed.

Optionally, positive electrode 212 can double as the fuel rod. In such an embodiment, some form of electrical insulation for insulating positive electrode 212 from the rest of plasma generating system 100 is required. One way to insulate positive electrode 212 is to manufacture rod-holder 1102 from a non-conductive material, such as a heat-resistant polymer and or ceramic. Another option is to insulate rod holder 1102 from the rest of plasma generating system 100 and utilize rod-holder 1102 as an electrical connection between positive electrode 212 and plasma generating circuit 202. Still another option is house electrode 212 in a non-conductive sheath, which is fed into the plasma at the same time.

Figure 12:
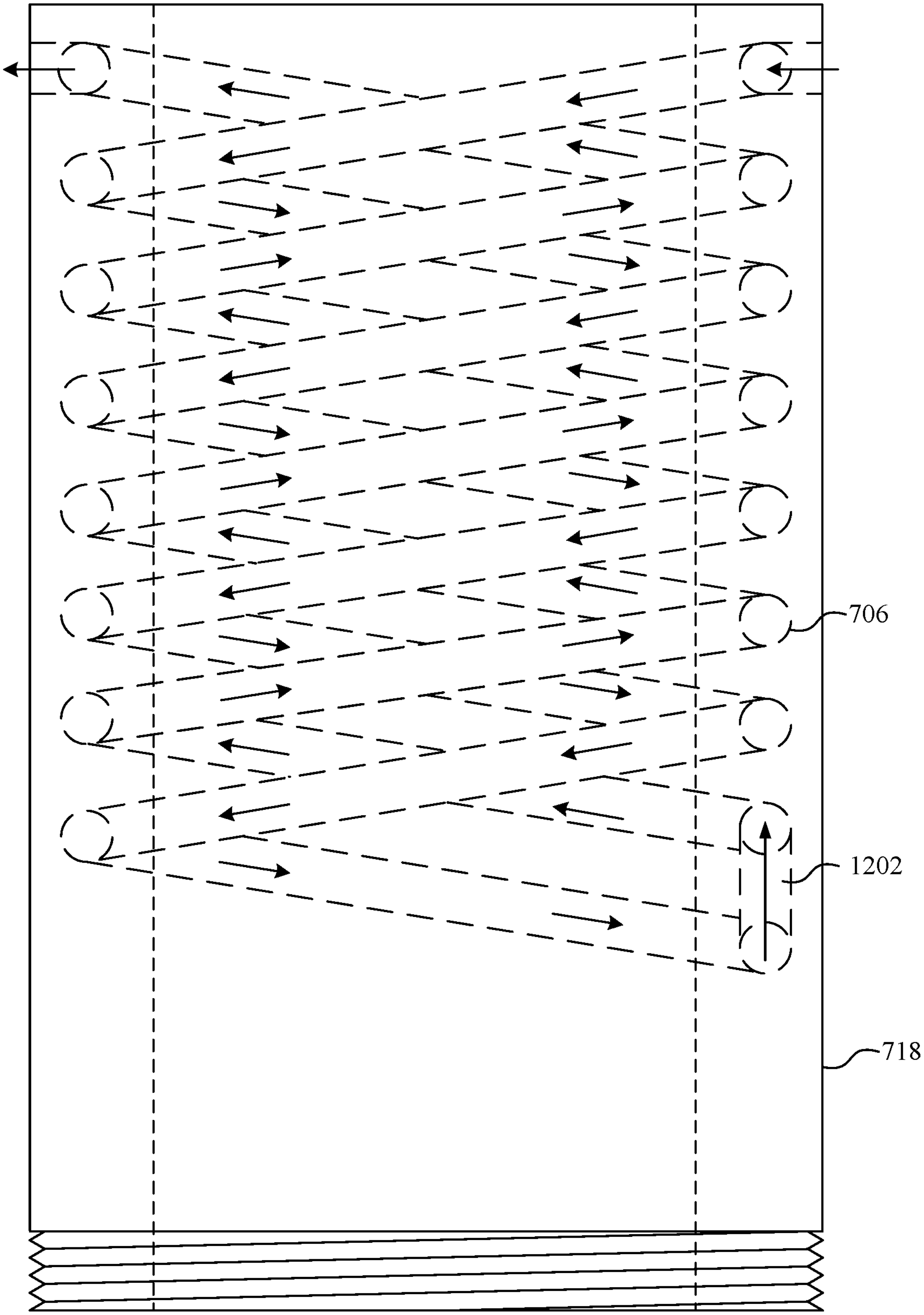
FIG. 12 is a side view showing the lower cooling sleeve of FIG. 7 and the flow of coolant therethrough.

FIG. 12 is a side view showing lower cooling sleeve 718, showing the flow of coolant therethrough. Lower cooling sleeve 718 is a hollow, stainless steel cylinder having helical passage 808 cut through. Coolant travels through helical passage 808 toward the bottom of cooling sleeve 718, passes through an intermediate channel 1202, and travels back up through helical passage 808 toward the top of cooling sleeve 718. By making two passes (one down and one back up), the coolant can absorb more heat than if it takes only one pass (down or up), flow rate being equal.

Figure 13A:
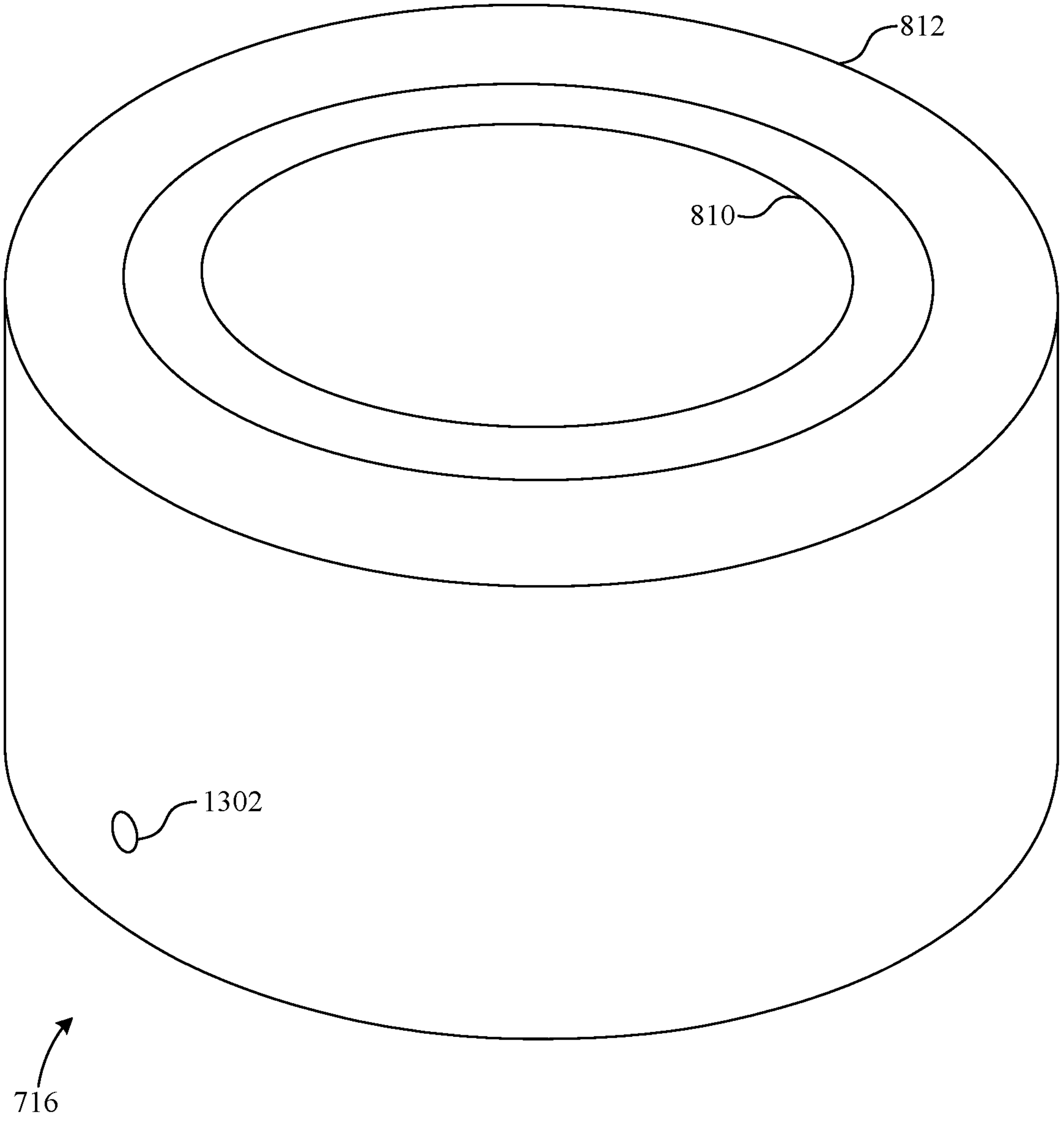
FIG. 13A a perspective view showing the upper cooling sleeve of FIG. 7.

FIG. 13A a perspective view showing upper cooling sleeve 716, including inner section 810 and outer section 812. Each of inner section 810 and outer section 812 are hollow stainless steel cylinders. The outer diameter of inner section 810 is roughly equal to the inner diameter of outer section 812, so that the inner section 810 and outer section 812 fit snugly together. Outer section 812 also includes an inlet 1302, which couples to intermediate coolant tube 722 to receive coolant from lower cooling sleeve 718.

Figure 13B:
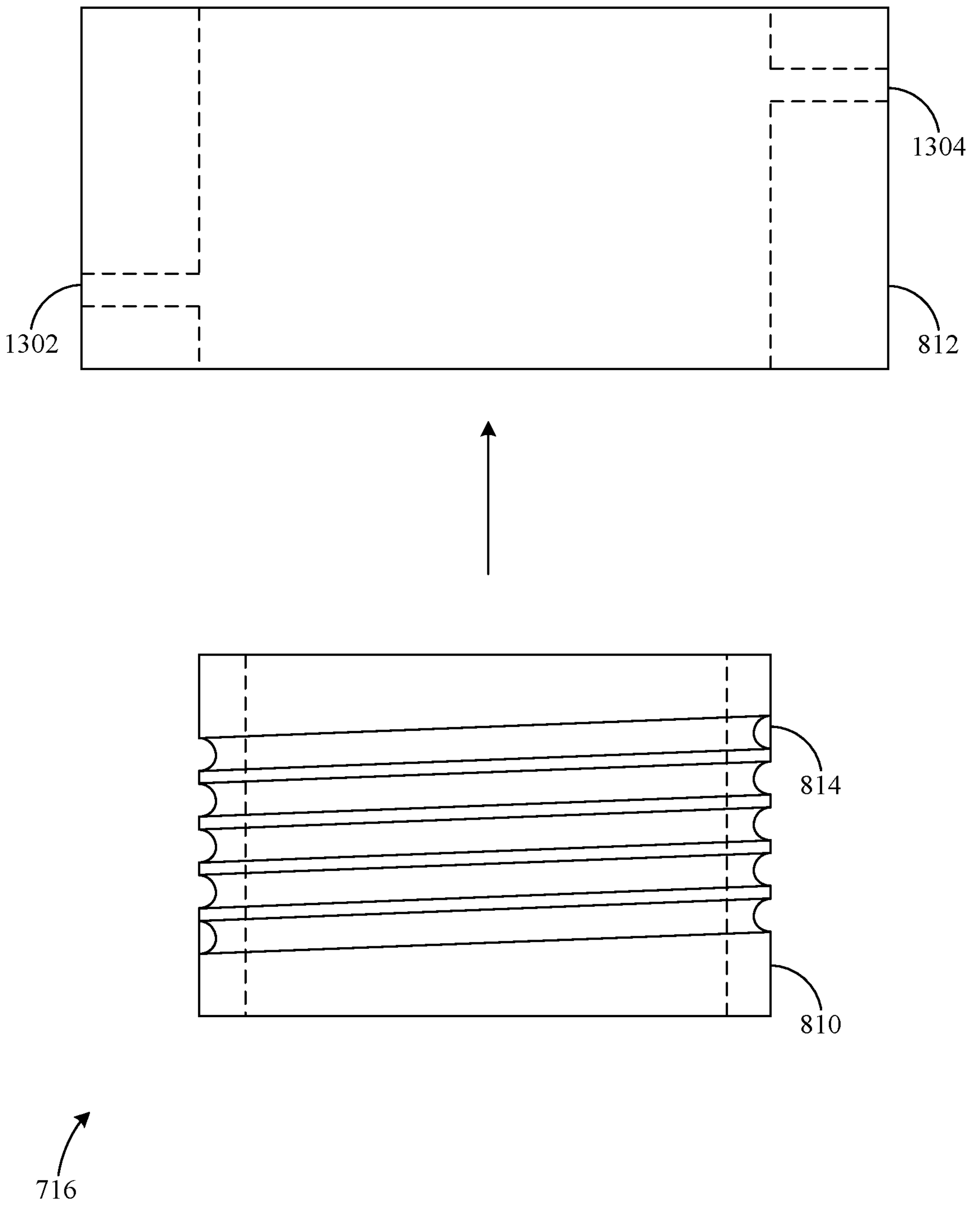
FIG. 13B is an exploded view showing the inner section and the outer section of the upper cooling sleeve of FIG. 7.

FIG. 13B is an exploded view showing upper cooling sleeve 716, including inner section 810 and outer section 812. Inner section 810 includes helical passage 814. Outer cooling sleeve includes inlet 1302 and an outlet 1304. Coolant travels in through inlet 1302, around helical passage 814, and out through outlet 1304. The coolant makes only one pass, because the plasma is not held directly within upper cooling sleeve 716, which, therefore, does not require as much cooling as lower cooling sleeve 718. Alternatively, the coolant could make two passes, if helical passage 814 is designed similarly to helical passage 808.

Figure 14A:
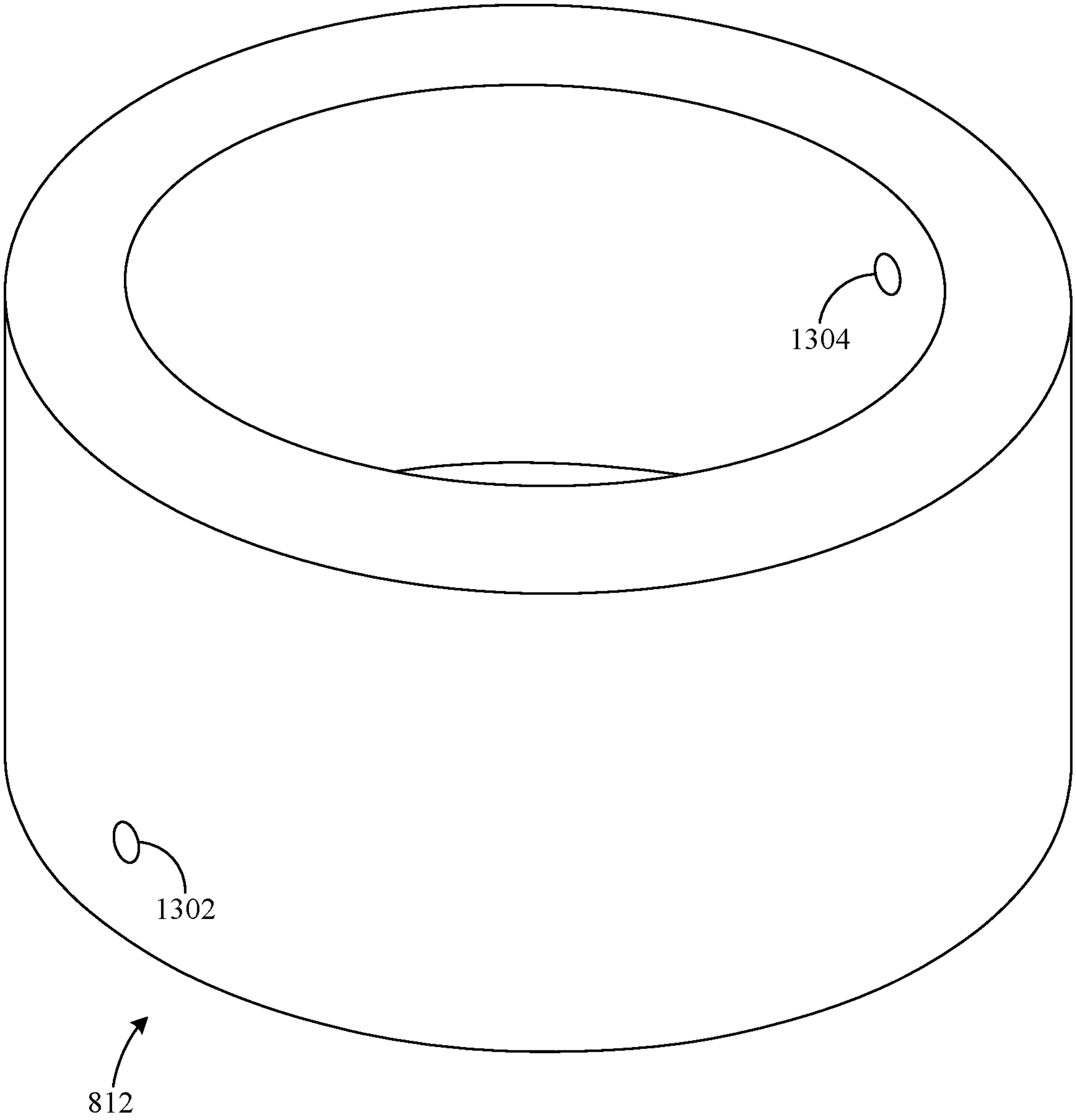
FIG. 14A is a perspective view showing the outer section of FIG. 13B.

FIG. 14A is a perspective view showing outer section 812, including inlet 1302 and outlet 1304.

Figure 14B:
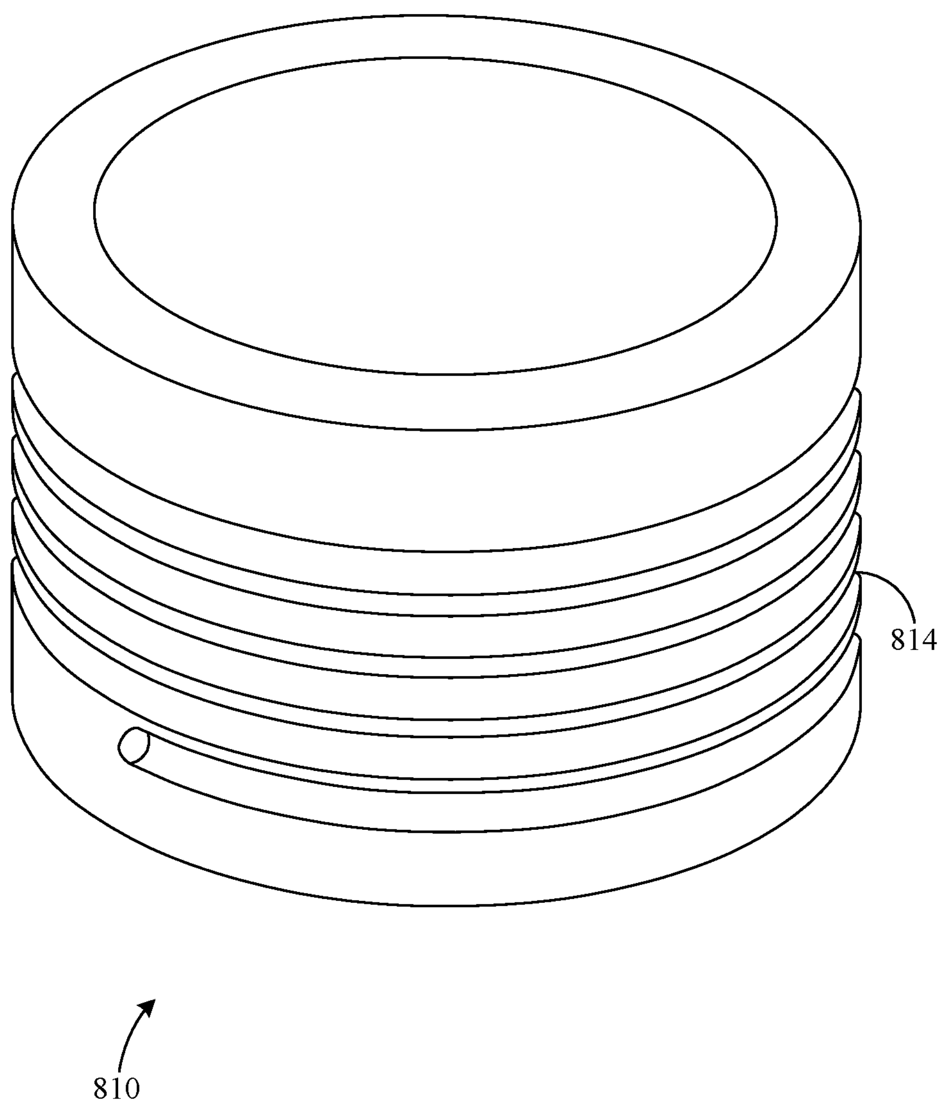
FIG. 14B is a perspective view showing the inner section of FIG. 13B.

FIG. 14B is a perspective view showing inner section 810, including helical passage 814.

FIG. 15 is a top view showing injection transformer 312, including primary winding 314, secondary windings 216, and core 316. Core 316 is a square shaped ferrite block made, for example, from a magnetic material available from Elna Magnetics as (3F3). Each side of core 316 has a plastic bobbin 1502 positioned there around. Primary winding 314 is wrapped around one of bobbins 1502. Secondary windings 216 are wrapped around the remaining bobbins 1502. In this embodiment, there are 10 wraps of secondary windings 216 around each bobbin 1502. Secondary windings 216 are formed from 8 gauge electrical wire, which is insulated for up to 40 kV. Transformer 312 is submerged in transformer oil for insulation and for cooling. The transformer oil is circulated around transformer 312 via one of coolant systems 904 (FIG. 9). AC current through primary winding 314 creates magnetic flux through core 316, which results in an electromotive force on secondary windings 216, creating a higher voltage current therethrough.

In alternate embodiments secondary windings 216 can be placed on the various sides of core 316 in any desired proportion (e.g. all 30 windings on a single side). Transformer 312 can also have more or fewer of primary winding 314 and/or secondary windings 216, depending on the required specifications for a particular application (e.g. a larger/smaller plasma generating system).

FIGS. 16A-16F show oscilloscope readings of the voltage across the plasma. The readings were taken via terminals "A" and "B" of FIG. 6. Each of FIGS. 16A-16F show a waveform that corresponds to an AC voltage across the plasma during operation of plasma furnace 102. The waveforms show AC voltage that is superimposed on DC current. The combination of AC and DC current expands the volume of the plasma compared to prior technologies, because it allows for the use of larger electrodes that are spaced farther apart. The increased plasma volume allows for greater mass throughput than can be achieved via the prior technologies.

Figure 17:
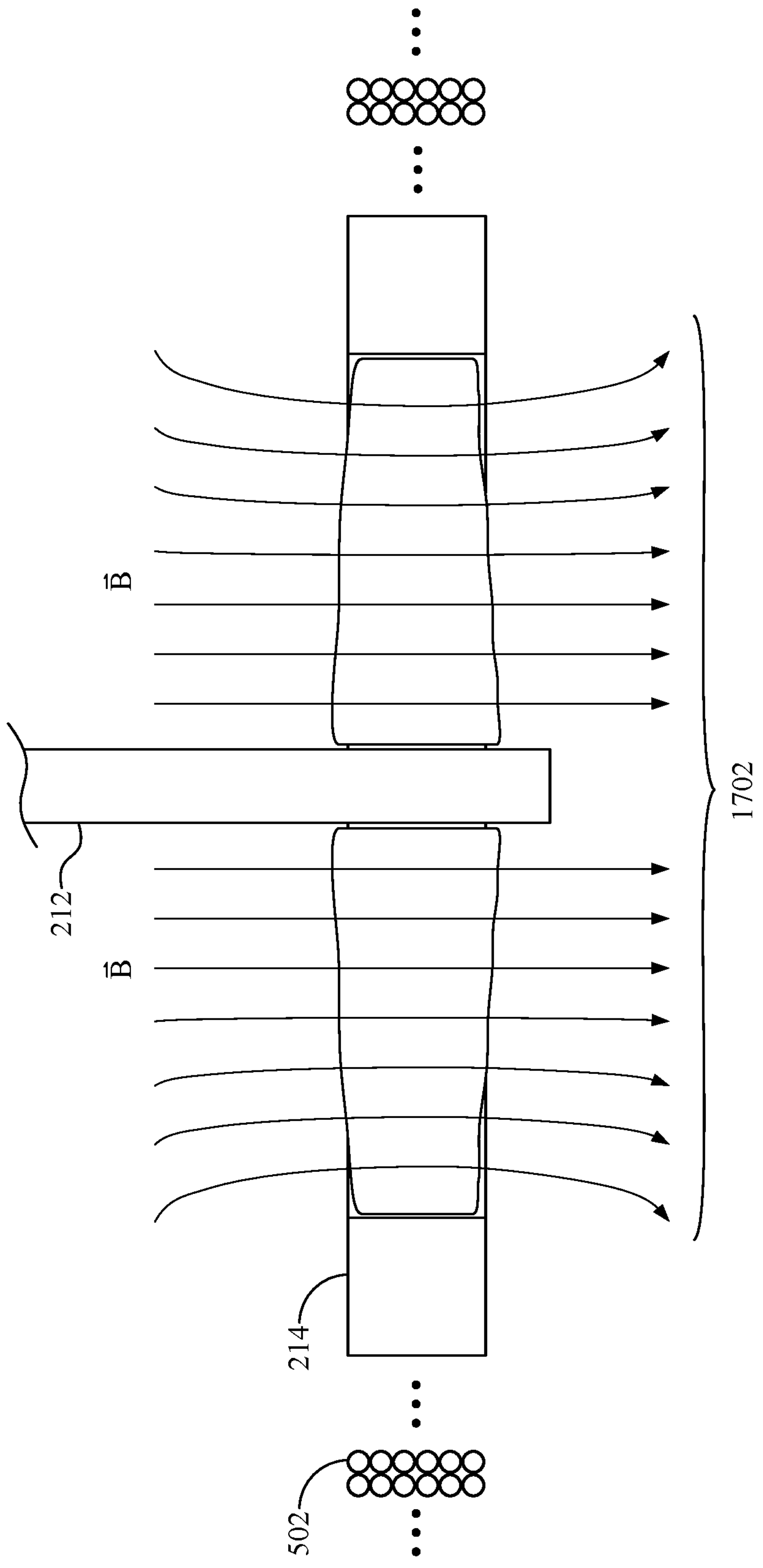
FIG. 17 is a sectional view showing a magnetic field generated by the electromagnet of FIG. 2.

FIG. 17 is a representational diagram of a portion of plasma furnace 102, including positive electrode 212, negative electrode 214, and windings 502 of electromagnet 208. Current through windings 502 generates a toroidal magnetic field 1702. In the vicinity of positive electrode 212 and negative electrode 214, magnetic field 1702 is substantially vertical. Magnetic field 1702 acts to impart a rotational force on charged particles within the plasma.

Figure 18:
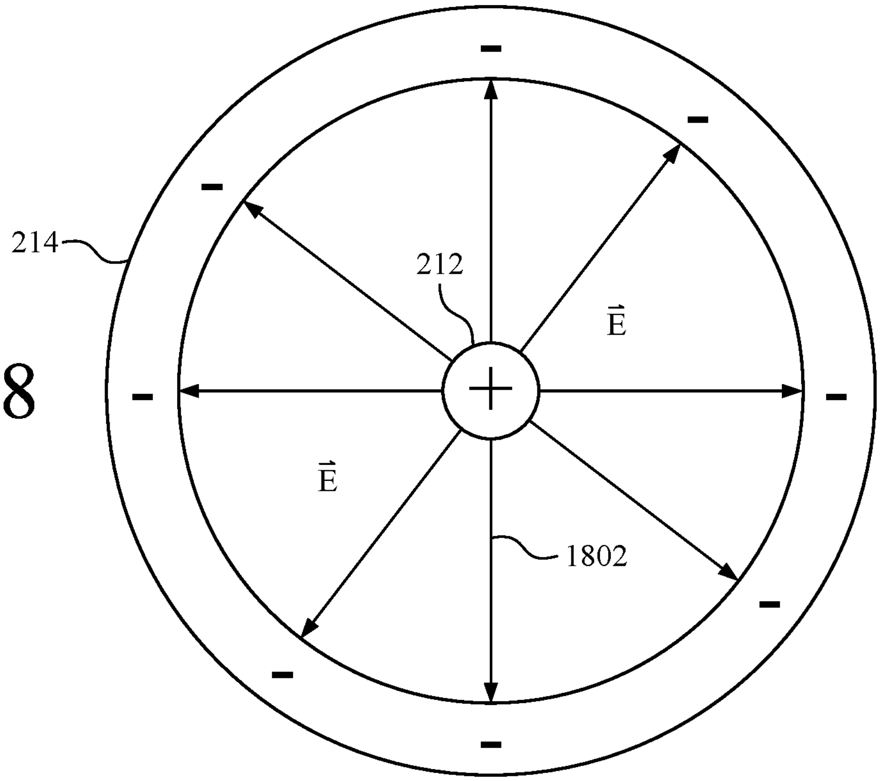
FIG. 18 is a top view showing an electric field between the positive and negative electrodes of FIG. 2.

FIG. 18 is a top view showing an electric field 1802 between positive electrode 212 and negative electrode 214. The strength of electric field 1802 is determined by the voltage differential that is applied across electrodes 212 and 214. Electric field 1802 originates from positive electrode 212 and spreads outward toward negative electrode 214.

Figure 19:
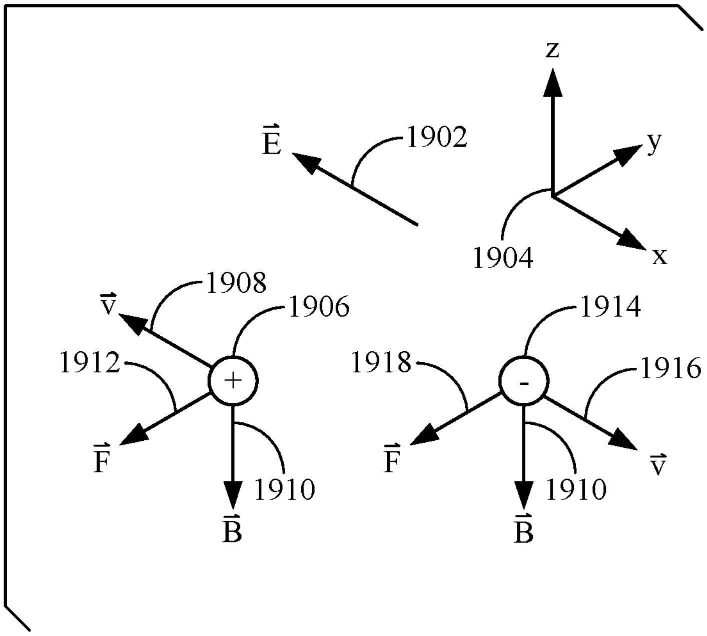
FIG. 19 is a diagram illustrating magnetic forces on charged particles within the plasma.

FIG. 19 is a diagram qualitatively illustrating magnetic forces on charged particles within the plasma. The directional component of the velocity of the charged particles is determined by the charge of the particles and the direction of electric field 1802, which is shown by electric field line 1902 to point in the negative x-direction (electric field line 1902 illustrates the direction of the electric field at an arbitrary point between electrodes 212 and 214) of a coordinate system 1904. A positive particle 1906 moves in the direction of electric field line 1902, therefore a velocity vector 1908 corresponding to particle 1906 points in the negative x-direction. Magnetic field 1702 points in the negative z-direction, thus, a magnetic field vector 1910 corresponding to particle 1906 points in the negative z-direction, as well. According to the Lorentz Force Law, the magnetic force asserted on particle 1904 is determined by the cross product of velocity vector 1908 and magnetic field vector 1910 and the charge of particle 1906. Because particle 1906 is positively charged, the magnetic force asserted on particle 1906 (illustrated by force vector 1912) is in the negative y-direction. The direction of the magnetic force on a negative particle 1914, in the same location as particle 1906, can be found similarly. Because particle 1906 is negative, a velocity vector 1916 corresponding to particle 1906 is directed in the positive x-direction (opposite the direction of electric field line 1902). Particle 1914 is also affected by the same magnetic field vector 1910 as particle 1906. Because particle 1914 is negatively charge and traveling in the opposite direction of particle 1906, a force vector 1918 corresponding to particle 1914 points in the same direction as force vector 1912. Because, foregoing analysis is qualitative only, the conclusions made are illustrative only. The motions of charged particles in magnetic field 1702 and electric field 1802 are complicated and depend on a number of factors, such as initial velocities, location within the plasma, etc. Therefore, FIG. 19 is intended to give only a general idea of the motion of particles within the plasma.

Figure 20:
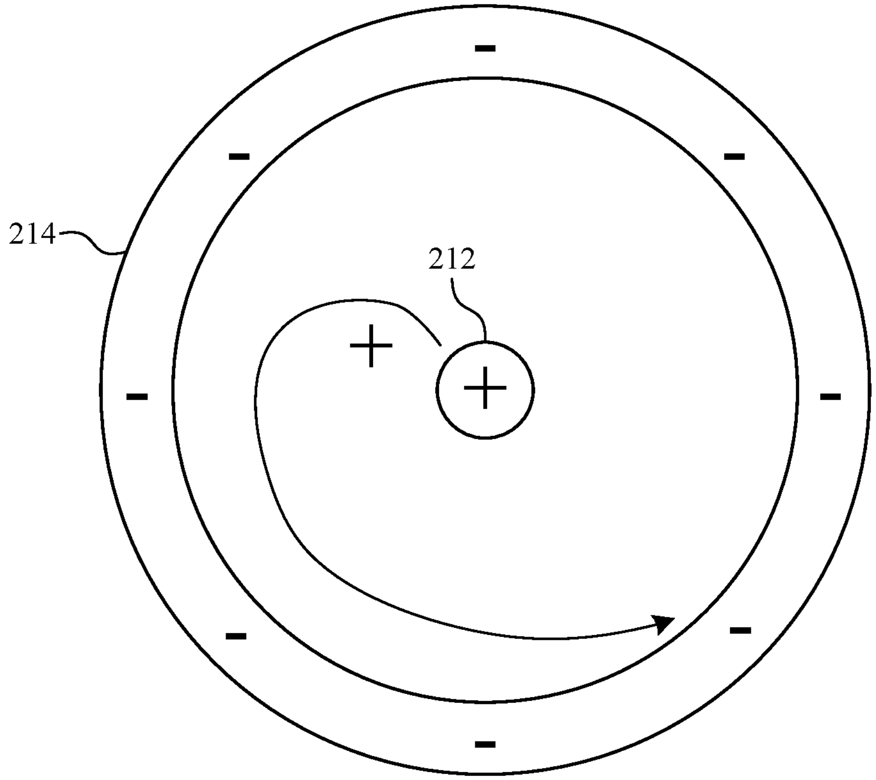
FIG. 20 is a top view showing the motion of the positive particle of FIG. 19 within the plasma.

FIG. 20 is a top view showing the motion of positive particle 1906 within the plasma. Positive particle 1906 is formed via ionization of atoms in the plasma. Particle 1906 is accelerated in the direction of electric field 1802 (toward negative electrode 214). As particle 1906 gains velocity, magnetic field 1702 asserts a rotational force on it (in the direction shown by FIG. 19). Therefore, particle 1906 traces a roughly spiral path as it moves toward negative electrode 214. Additionally, particle 1906 gains rotational velocity as it moves outward.

Figure 21:
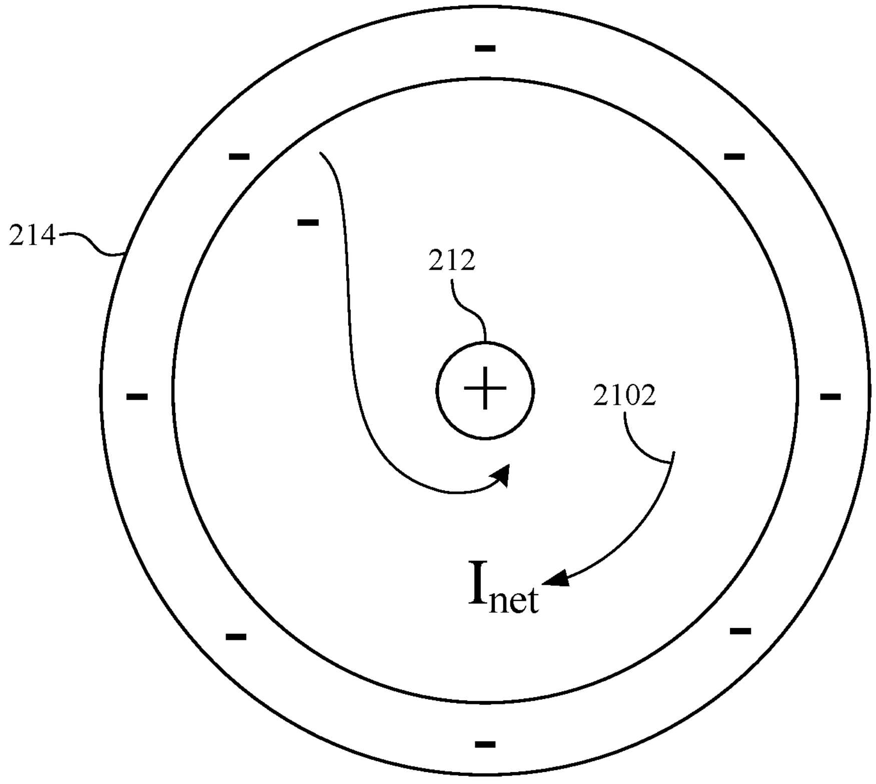
FIG. 21 is a top view showing the motion of the negative particle of FIG. 19 within the plasma.

FIG. 21 is a top view showing the motion of negative particle 1914 within the plasma. Negative particle 1914 can be formed via ionization or, more likely, can enter the plasma from negative electrode 214. Particle 1906 is accelerated in the opposite direction of electric field 1802 (toward positive electrode 212). As particle 1914 gains velocity, magnetic field 1702 asserts a rotational force on it (in the direction shown by FIG. 19). Additionally, particle 1906 gains rotational velocity as it moves outward. Because the acceleration of any particle under a particular force is dependent on the mass of the particle, the negative particles in the plasma travel at a significantly higher velocity than the positive particles in the plasma (a proton is approximately a thousand times more massive than an electron). Therefore, a net current 2102 (in the opposite direction of the particles) is established in the plasma.

Figure 22:
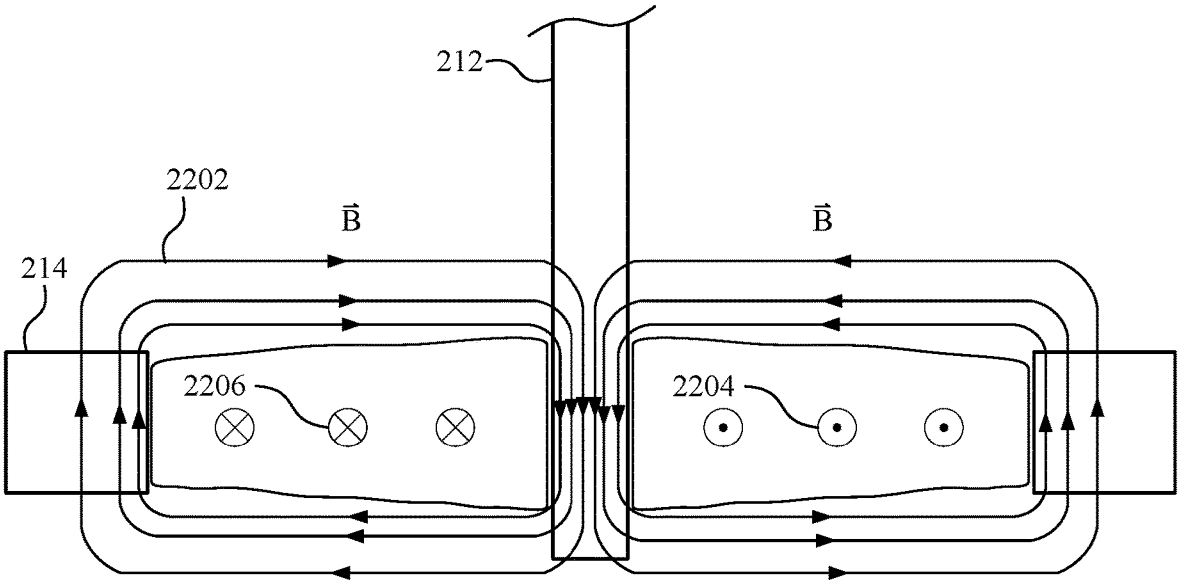
FIG. 22 is a sectional view showing a magnetic field generated by the net current of FIG. 21.

FIG. 22 is a sectional view showing a magnetic field 2202 generated by net current 2102. Current 2102, illustrated by vectors 2204 and 2206, travels in the opposite direction of the charged particles in the plasma. On the right side of positive electrode 212 (with respect to FIG. 22), vectors 2204 point out of page. On the left side of positive electrode 212 (with respect to FIG. 22), vectors 2206 point into the page. Net current 2102 generates magnetic field 2202, which is toroidal in shape, around the plasma. Because adjacent particles within the plasma have magnetic fields that cancel between them, magnetic field 2202 exists only outside of the plasma. The direction of magnetic field 2202 is given by the Biot-Savart Law, and tends to direct charged particles having vertical velocities back toward the plasma. Therefore, the plasma is contained in the vertical direction by the magnetic field generated by the charged particles in the plasma itself.

Figure 23A:
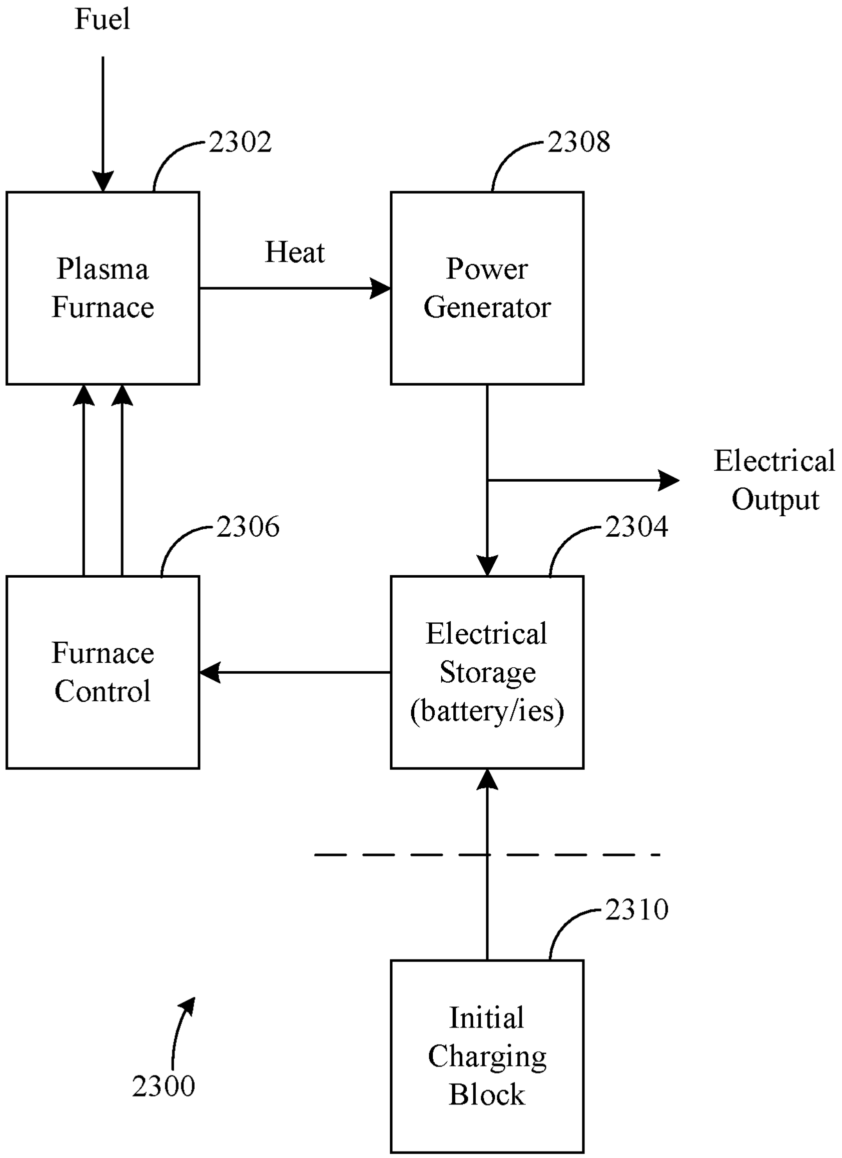
FIG. 23A is a block diagram showing an alternate plasma generating system that can be run with battery power.

FIG. 23A is a block diagram of an alternate plasma generating system 2300 that can be run with battery power. A plasma furnace 2302 is powered by electrical storage 2304 (e.g. a battery). A furnace control 2306 manages the amount of power that is used by plasma furnace 2302. Fuel is consumed by plasma furnace 2302, which then produces excess heat. The excess heat is converted into electrical energy by a power generator 2308. The electrical output is used to recharge electrical storage 2304 and is provided for storage and/or use elsewhere. In order to run initially, electrical storage 2304 is charged by an initial charging block 2310. Initial charging block 2310 can be an onsite source of power (e.g. a solar panel) or an off-site source. In the case of initial charging block 2310 being an off-site source, electrical storage 2304 is charged off-site and brought to plasma furnace 2302.

Figure 23B:
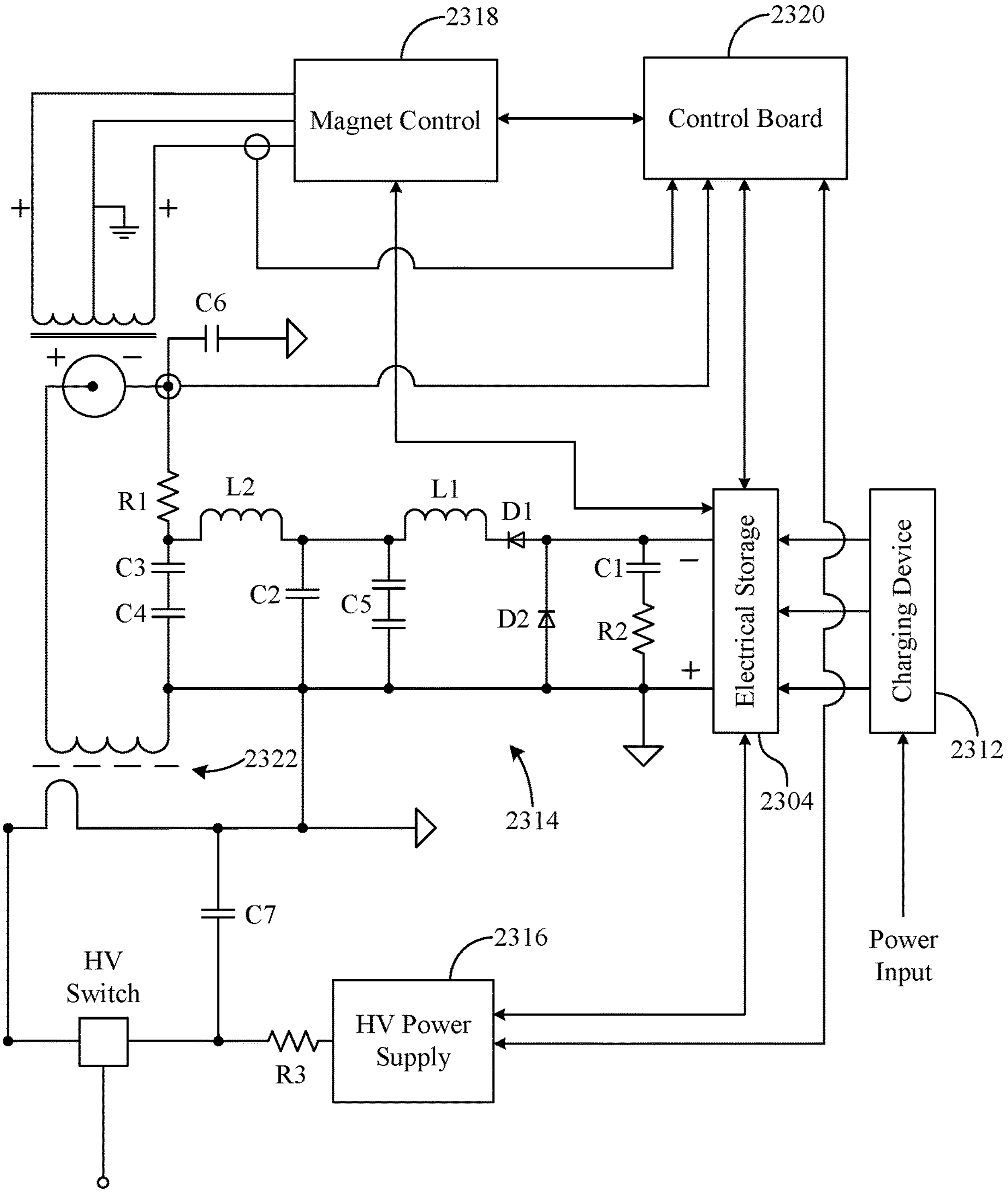
FIG. 23B is a schematic diagram showing a portion of the plasma generating system of FIG. 16A.

FIG. 23B is a schematic diagram of a portion of plasma generating system 2300. FIG. 23B is similar to FIG. 6, with some changes to the power supplies for the various elements. SCR bridge 402 and power supply 220 are replaced by electrical storage 2304, which is charged by a charging device 2312 (which may be initial charging block 2310 or power generator 2308). Electrical storage 2304 provides DC current to an impedance matching circuit 2314 (substantially similar to impedance matching circuit 106), a HV power supply 2316, which replaces HV power supply 218, a magnet control 2318 (substantially similar to magnet power supply 228), and a control board 2320 (substantially similar to control board 602). HV power supply 2316 converts the supplied DC current to AC current to operate an injection transformer 2322, which is substantially similar to injection transformer 312. Effectively, HV power supply 2316 is a power inverter.

Plasma generating systems 100 and 2300 can be employed in a great variety of applications. For example, the plasma can be used to refine mining tailings. As another example, the plasma can be used to render radioactive material non-radioactive. In particular, when radioactive materials are passed through the plasma, the product is non-radioactive.

As yet another example, the plasma can be used to generate heat from fuels from which known devices could not extract energy. For example, in one example implementation, the plasma generating and containment system of the present invention functions as a failsafe nuclear reactor. Plasma generating system 100 (or plasma generating system 2300) creates a sustainable plasma at an extremely high temperature/energy. When heavy elements, such as lead, are introduced into the plasma, lighter elements, such as gold and/or platinum, are produced. The inventor has discovered that high energy particles (in excess of 5 MeV) are present in system 100 during operation. When heavy nuclei are struck by very energetic particles (e.g., photons or subatomic particles), such as those present in system 100 during operation, nuclear reactions can occur. When a nucleus interacts with a high energy particle, a nuclear reaction may be induced which releases a large amount of energy. Inventor experiments have shown that plasma generating system 100 generates approximately 5 times more energy than would be expected from purely chemical interactions, demonstrating (along with the elements introduced and discharged from the plasma) that nuclear interactions are taking place within plasma generating system 100 during operation. In a particular experiment, 400 mesh lead powder was introduced into the plasma. In addition to a large amount of heat energy, a 400 mesh powder containing 30-40 different elements was produced.

In another experiment, iron powder was introduced into the plasma, and heavier metals including copper, silver, gold, and platinum were produced. In yet another experiment, the surface of a tungsten rod was converted to lead and a scattering of other metals.

The literature explains that nuclear reactions can occur in plasma under certain conditions. Bychenkov, V. Yu, V. T. Tikhonchuk, and S. V. Tolokonnikov. "Nuclear reactions triggered by laser-accelerated high-energy ions." *Journal of Experimental and Theoretical Physics* 88.6 (1999): 1137-1142, suggests that nuclear reactions occur in plasma with the assistance of lasers that accelerate ions to several MeV. Schumer, J. W., et al. "Evidence of heavy-ion reactions from intense pulsed warm, dense plasmas." 2010 Abstracts IEEE International Conference on Plasma Science. 2010, describes nuclear reactions caused by acceleration of heavy ions across the anode-cathode gap in warm, dense plasmas.

It should be understood that the nuclear reactions that occur here cannot result in a nuclear chain reaction. The reactions are not self-sustaining. When the electrical power to the plasma generating circuit is interrupted, the plasma simply dissipates. As a result, nuclear energy can be extracted from fuels, without any risk of a runaway reaction. Also, the amount of radiation produced is small and well within safety limits.

Figure 24:
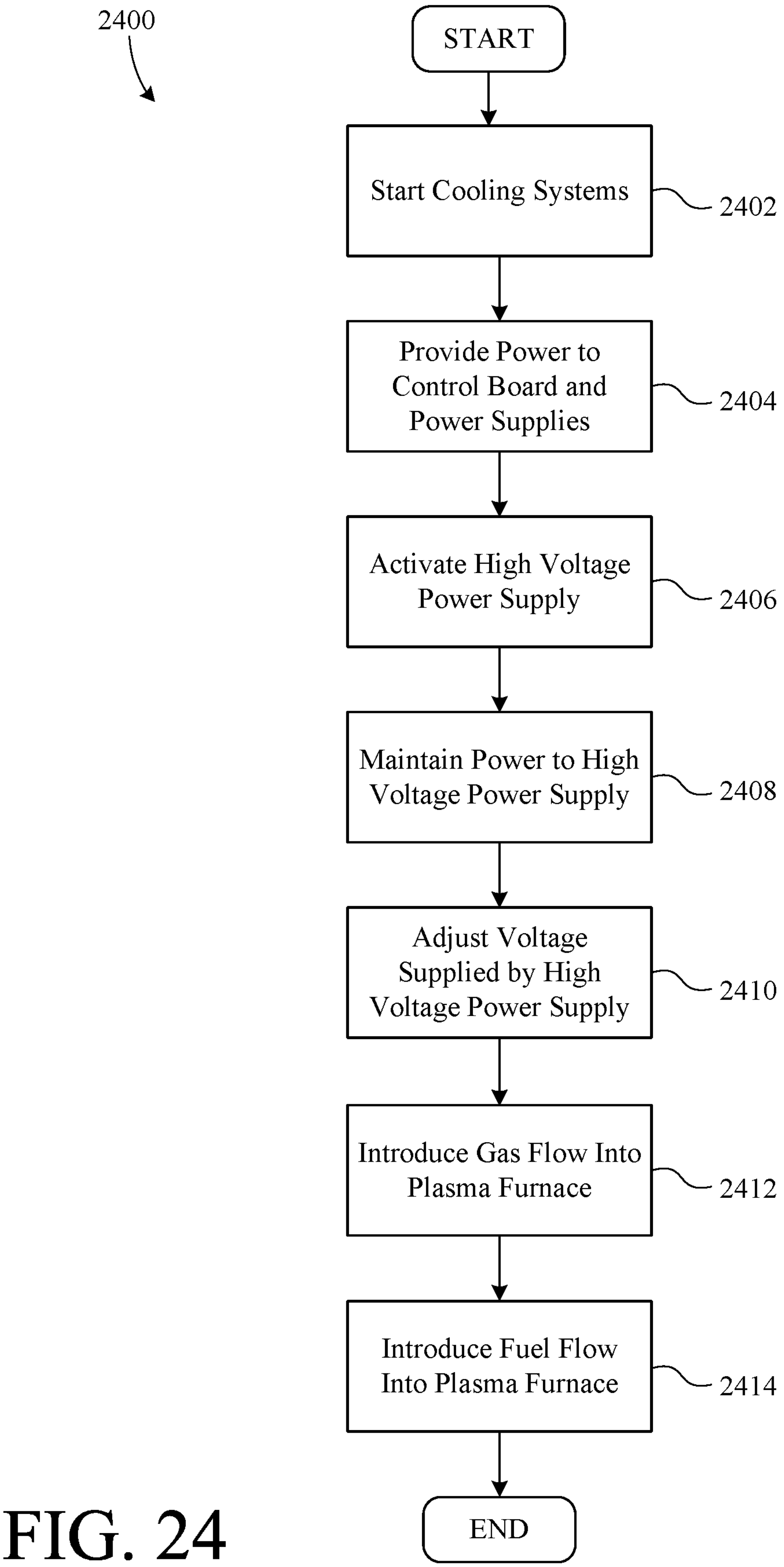
FIG. 24 is a flow chart summarizing an example method for operating a plasma generating system.

FIG. 24 is a flow chart summarizing an example method 2400 for operating a plasma generating system. In a first step 2402, cooling systems are started. The cooling systems pump coolant into and out of the plasma furnace and power supplies, which require temperature regulation. Then, in a second step 2404, power is provided to a control board and power supplies. Next, in a third step 2406, a high voltage power supply is activated. The high voltage power supply provides a series of high voltage pulses for generating the plasma. Then, in a fourth step 2408, the power to the high voltage power supply is maintained. Next, in a fifth step 2410, the voltage supplied by the high voltage power supply is adjusted. The voltage is adjusted based on the various factors, such as the state of the plasma and/or the particular use for the plasma generating system. Then, in a sixth step 2412, gas flow is introduced into the plasma furnace. Finally, in a seventh step 2414, fuel flow is introduced into the plasma furnace.

Figure 25:
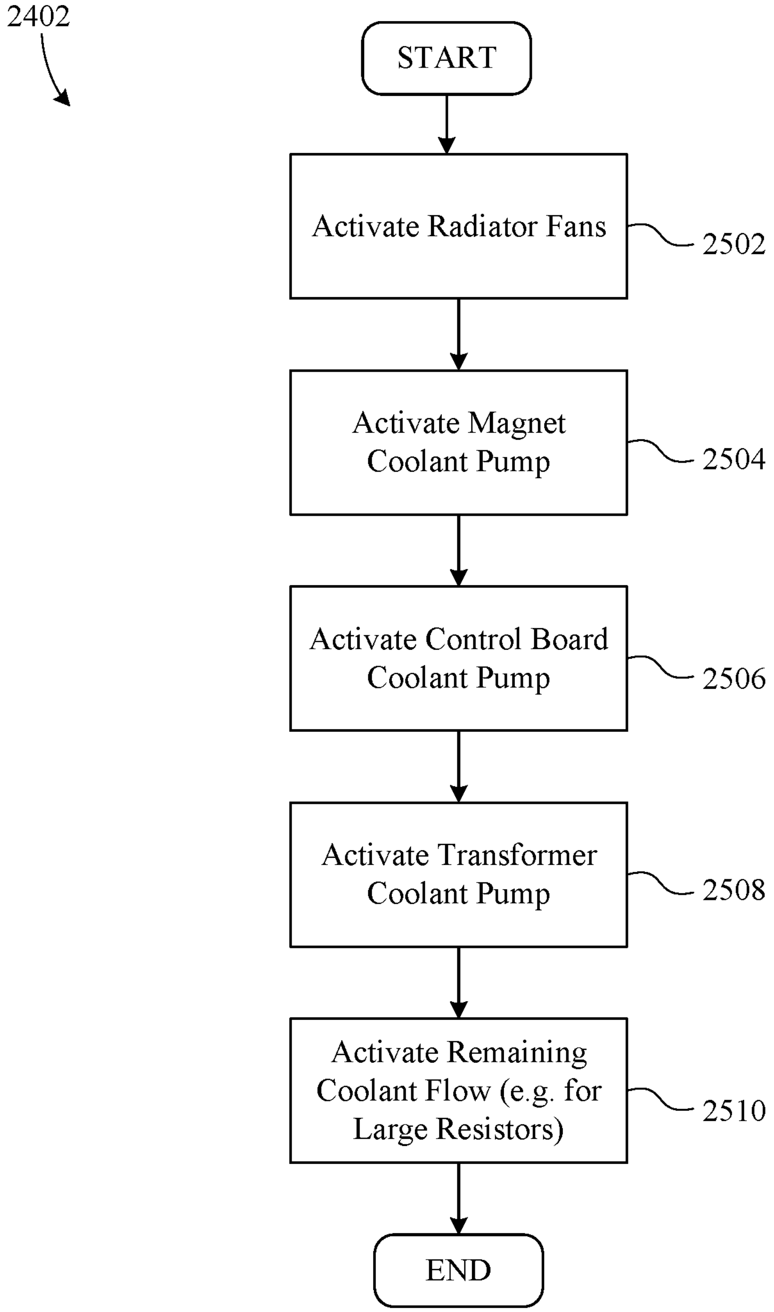
FIG. 25 is a flow chart summarizing an example method for performing a step of the method of FIG. 24.

FIG. 25 is a flow chart summarizing an example method for performing step 2402 of method 2400. In a first step 2502, radiator fans are activated. The radiator fans help to disperse thermal energy from the coolant into the surrounding environment by circulating relatively cool air. Next, in a second step 2504, a magnet coolant pump is activated. The magnet coolant pump circulates coolant through the magnet containment box, which houses the windings of the electromagnet. Then, in a third step 2506, a control board coolant pump is activated. The control board coolant pump circulates coolant through various devices of the control board, such as transformers, processors, etc., which require temperature regulation. Next, in a fourth step 2508, a transformer coolant pump is activated. The transformer coolant pump circulates coolant around the injection transformer, which requires temperature regulation. Finally, in a fifth step 2510, the remaining coolant flow is activated. The remaining coolant flow is used to cool any other components that require temperature regulation, such as large resistive elements.

Figure 26:
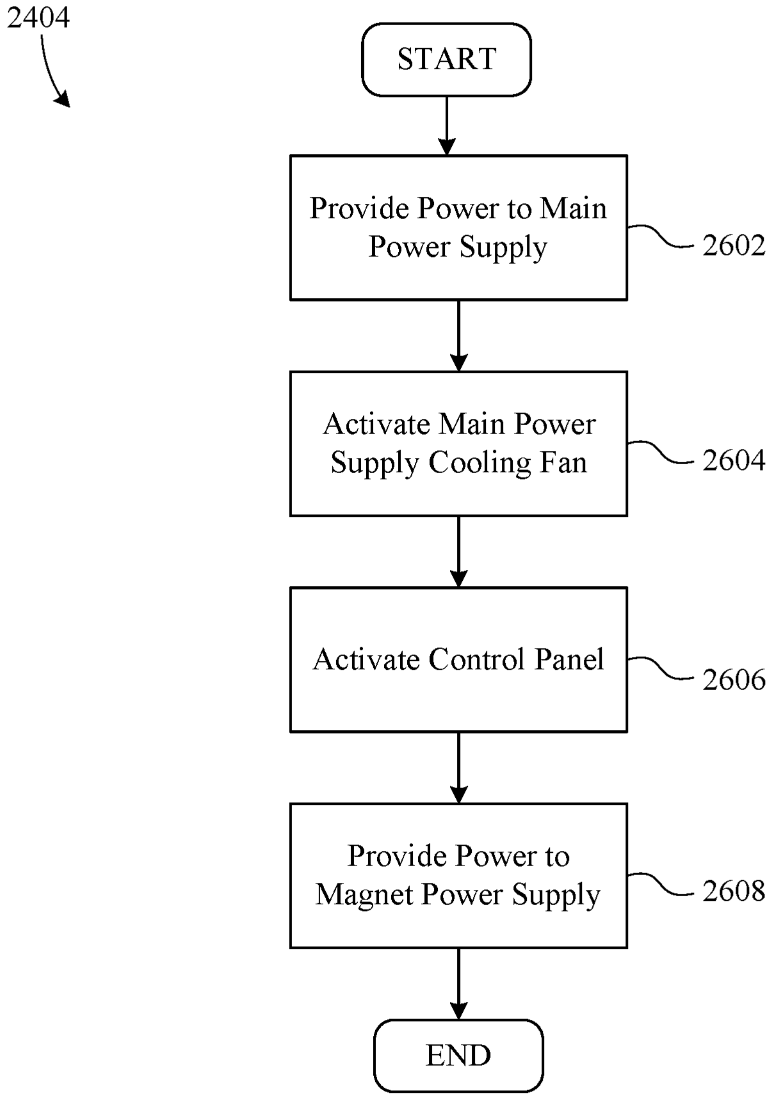
FIG. 26 is a flow chart summarizing an example method for performing another step of the method of FIG. 24.

FIG. 26 is a flow chart summarizing an example method for performing step 2404 of method 2400. In a first step 2602, power is provided to a main power supply. Then, in a second step 2604, a main power supply cooling fan is activated. Next, in a third step 2606, the control panel is activated. Finally, in a fourth step 2608, power is provided to the magnet power supply.

Figure 27:
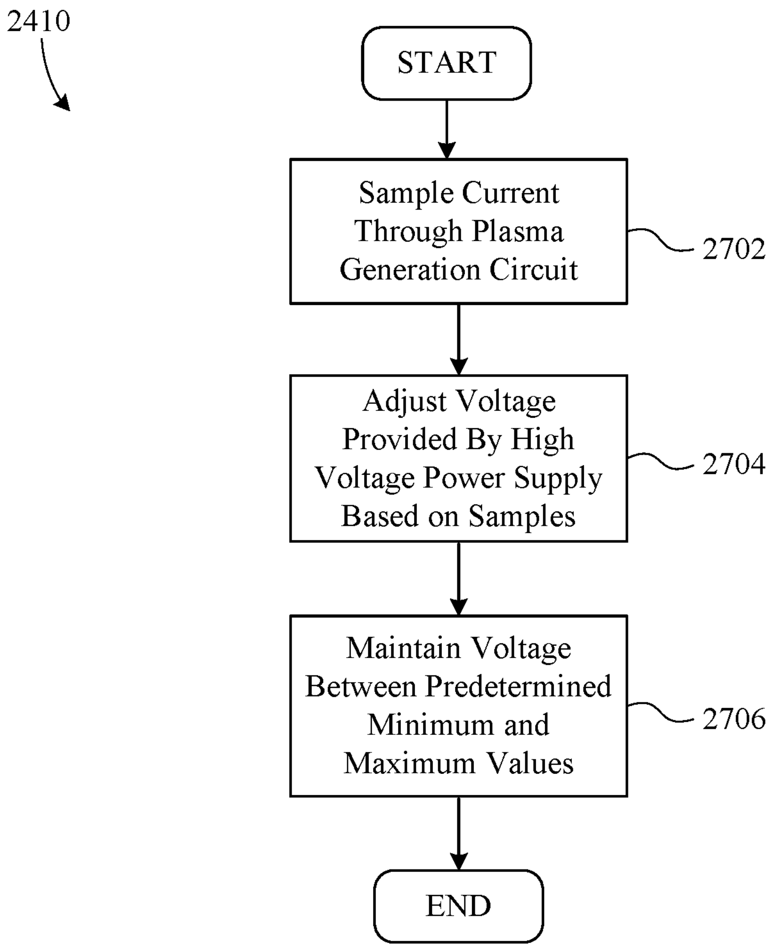
FIG. 27 is a flow chart summarizing an example method for automating yet another step of the method of FIG. 24.

FIG. 27 is a flow chart summarizing an example method for automating step 2410 of method 2400. In a first step 2702, current through the plasma generation circuit is sampled. Then, in a second step 2704, the voltage provided by the high voltage power supply is adjusted based on the samples. Finally, in a third step 2706, the voltage is maintained between predetermined minimum and maximum values.

Figure 28:
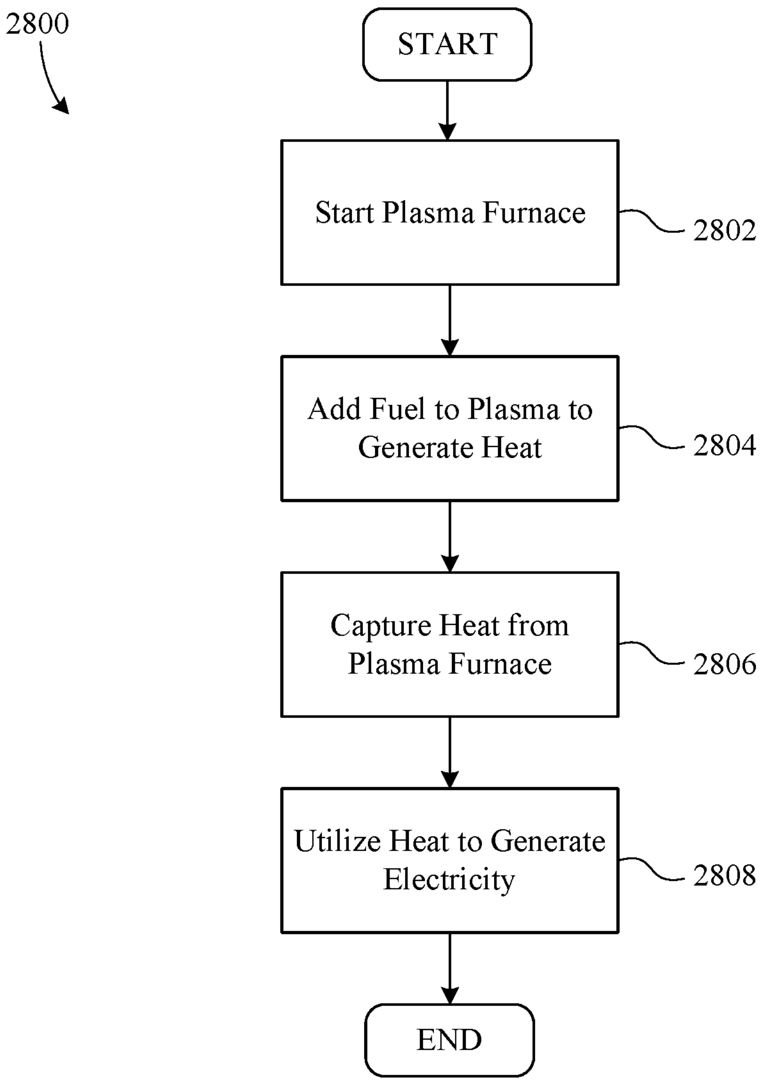
FIG. 28 is a flow chart summarizing an example method for utilizing a plasma generating system to generate electrical energy.

FIG. 28 is a flow chart summarizing an example method 2800 for utilizing a plasma generating system to generate electrical energy. In a first step 2802, a plasma furnace is started. Then, in a second step 2804, fuel is added to the plasma to generate heat. Next, in a third step 2806, heat is captured from the plasma furnace. Heat can be captured from the plasma furnace in a variety of ways, including, but not limited to, submerging the plasma furnace in water to generate steam, circulating coolant fluid through the plasma furnace, etc. Finally, in a fourth step 2808, the heat is utilized to generate electricity. The heat can be utilized, for example, to run a steam turbine, a Stirling engine, etc.

Figure 29:
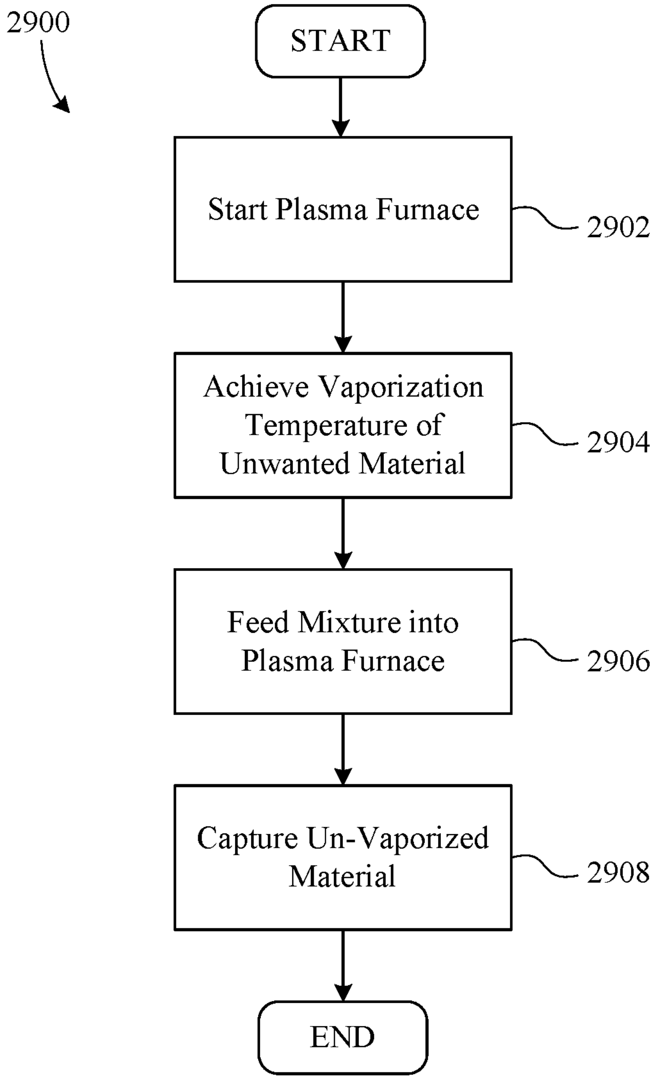
FIG. 29 is a flow chart summarizing an example method for utilizing a plasma generating system to refine materials.

FIG. 29 is a flow chart summarizing an example method 2900 for utilizing a plasma generating system to refine materials. In a first step 2902, a plasma furnace is started. Then, in a second step 2904, a vaporization temperature of an undesired material is achieved. Next, in a third step 2906, a mixture containing the undesired material and a desired material is fed into the plasma furnace. Finally, in a fourth step 2908, un-vaporized (i.e. desired) material is captured. Alternatively, the vaporized material may be the desired material and is captured after the plasma furnace has been shut down and cooled.

Figure 30:
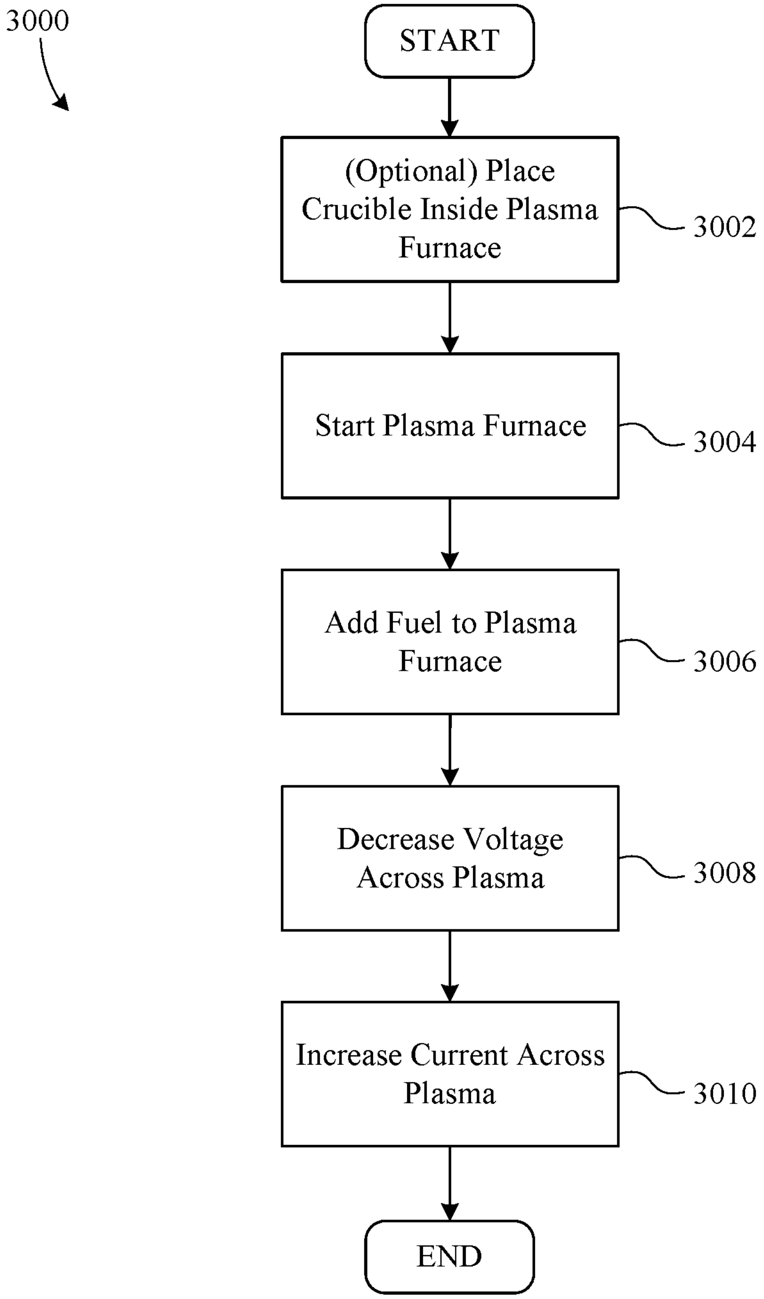
FIG. 30 is a flow chart summarizing an example method for utilizing a plasma generating system for accelerating particles.

FIG. 30 is a flow chart summarizing an example method 3000 for utilizing a plasma generating system for accelerating particles. Optionally, in a first step 3002, a crucible is placed inside the plasma furnace. The crucible may contain material with which it is intended to collide particles. Then, in a second step 3004, the plasma furnace is started. Next, in a third step 3006, fuel is added to the plasma furnace. Then, in a fourth step 3008, the voltage across the plasma is decreased. Finally, in a fifth step 3010, the current across the plasma is increased. By decreasing the voltage and increasing the current, the rotational velocity of the plasma and, hence, the translational velocity of the particles is increased.

Figure 31:
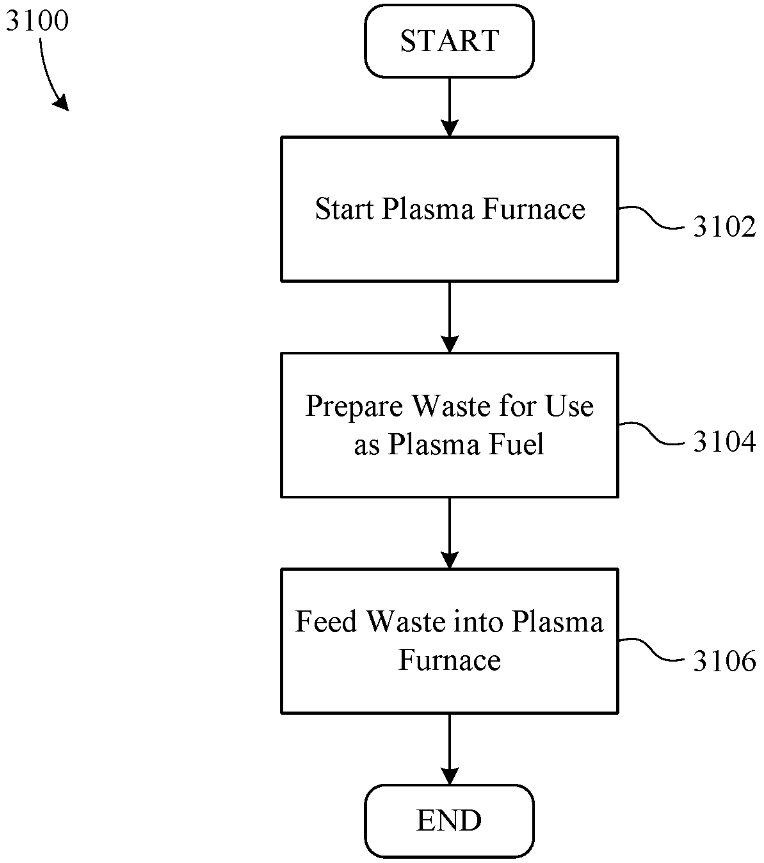
FIG. 31 is a flow chart summarizing an example method for utilizing a plasma generating system for eliminating waste.

FIG. 31 is a flow chart summarizing an example method 3100 for utilizing a plasma generating system for eliminating waste. In a first step 3102, a plasma furnace is started. In a second step 3104, waste is prepared for use as plasma fuel. The waste can be, for example, household garbage from a waste treatment facility, nuclear waste from a power plant or weapons facility, or any other unwanted material. The waste should be broken down into relatively small, regular pieces by grinding, shredding, etc. Finally, in a third step 3106, the waste is fed into the plasma furnace. As noted above, radioactive materials that are fed into the furnace will not be radioactive when removed.

Figure 32:
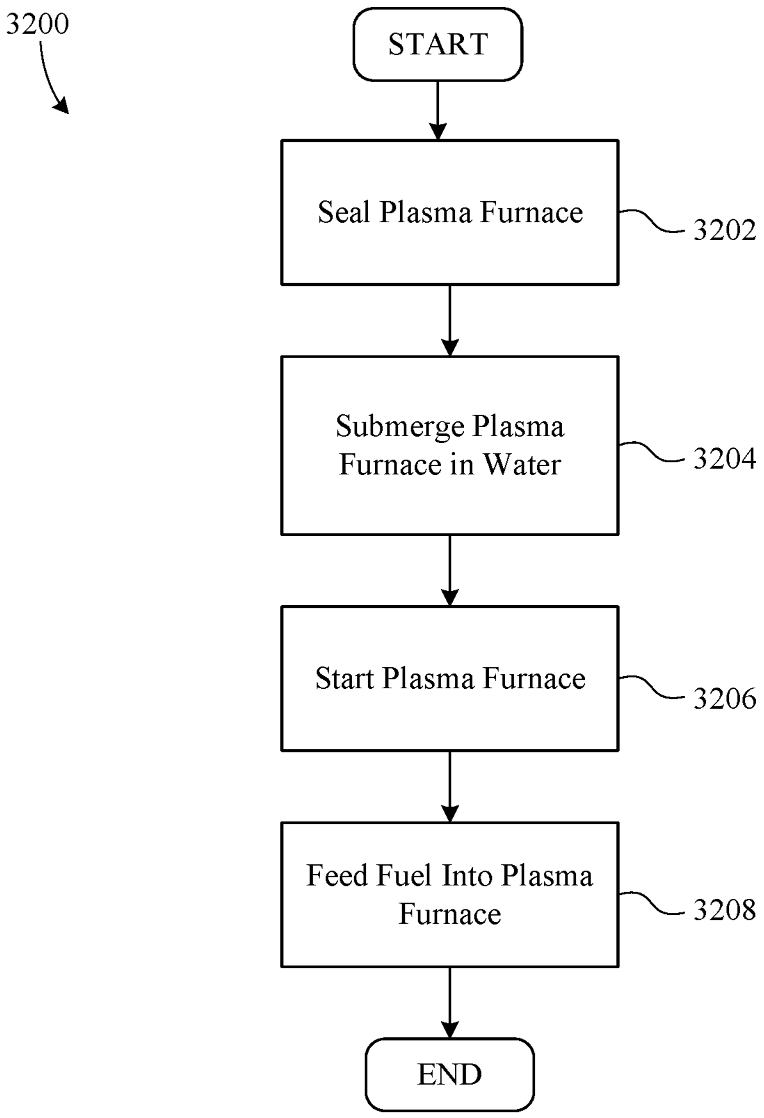
FIG. 32 is a flow chart summarizing an example method for utilizing a plasma generating system for steam creation.

FIG. 32 is a flow chart summarizing an example method 3200 for utilizing a plasma generating system for steam creation. In a first step 3202, the plasma furnace is sealed. Sealing the plasma furnace prevents water and other materials from entering the furnace except those introduced intentionally. Then, in a second step 3204, the plasma furnace is submerged in water. Chutes, wires, other inputs/outputs, and/or some components of the furnace may be only partially submerged for access, functional reasons, etc. Next, in a third step 3206, the plasma furnace is started. Finally, in a fourth step 3208, fuel is fed into the plasma furnace.

In addition to the advantages listed above, the disclosed plasma generating system provides the following benefits. For example, the applied energy can be independent of all process variables (e.g., purification processes), thereby allowing for unconstrained operating conditions. Another advantage is provided by the size of the electrodes in the above example embodiment. The large spacing between the electrodes allows for a larger plasma volume and the large size of the electrodes extends their life. Additionally, the central electrode can be used as a consumable in the plasma, thereby reducing (or potentially eliminating) interruption of furnace operation. In addition, because the outer electrode has the appearance of a 360 degree banked motor race track, it is very large in comparison to the inner electrode. For this reason, the energy emitted from the inner electrode is dispersed over a larger area of the outer electrode (in comparison to the prior art), further extending the life of the outer electrode.

Another advantage is the ability to operate the disclosed plasma furnace without pushing plasma out of the furnace, as in prior art systems. As a result, a starter gas can be used to initiate the plasma, and, once the plasma is initiated, solids that are fed into the plasma generate their own gases. Particular solids can be selected to generate gases that are utilized in producing desired reactions within the furnace. Thus, the disclosed plasma furnace produces the heat and the desired atmosphere for desired chemical reactions to take place. Additionally, the gases produced in the furnace by the continuous feeding of solid reactants push reaction products out of the furnace.

The disclosed plasma furnace also generates extremely high temperatures. Typical gas temperature with a plasma range from 3,000 to 6,000° C. (and get as high as 10,000° C.). These temperatures can be achieved by the disclosed plasma furnace without regard to gas composition. For comparison, the adiabatic flame temperature for burning hydrogen with pure oxygen is 4,600° C., whereas the adiabatic flame temperature for burning hydrogen with air is 2,250° C. The high temperatures in the disclosed plasma furnace provide high energy flux (i.e. the ability to transfer energy through a unit area per unit time). The high energy flux, due to the high temperatures, ensures rapid heating of material injected into the plasma. As a result of rapid heating, the furnace size can be reduced to achieve the same output. The high energy flux also allows high throughput and optimum yield to be achieved, because the high energy flux rapidly heats gasses and/or particulate solids in the disclosed furnace. At higher temperatures reaction rates are higher.

Yet another advantage of the disclosed furnace is the ability to respond quickly to an increase or decrease in the power settings (due to the small size). The furnace can be cooled quickly for maintenance and be restarted almost instantly. Another advantage owing to the relatively small size of the furnace and/or the rapid response time is the ability to be reconfigured for production of different products over a short time period (e.g. a few hours to a few days). A plant utilizing the disclosed furnace can respond quickly to market conditions, achieving optimum return for investors.

Additional methods for using plasma systems such as those disclosed herein, and data resulting from such uses, are disclosed in U.S. Provisional Patent Application No. 62/551,474, filed on Aug. 29, 2017 by the same inventor, which is incorporated herein by reference in its entirety.

The description of particular embodiments of the present invention is now complete. Many of the described features may be substituted, altered or omitted without departing from the scope of the invention. For example, alternate electrical circuits, may be substituted for the impedance matching circuit, the injection circuit, or the plasma generation circuit. As another example, any exact parameters given (e.g. voltages, currents, resistances, inductances, capacitances, etc.) may be substituted as needed for plasma furnaces of differing size, shape, etc. These and other deviations from the particular embodiments shown will be apparent to those skilled in the art, particularly in view of the foregoing disclosure.

I claim:

1. A method comprising:

providing a first conductive element;

providing a second conductive element spaced apart from and surrounding said first conductive element, said first conductive element and said second conductive element defining a space therebetween;

electrically coupling said first conductive element and said second conductive element with a control circuit to form an open ignition circuit;

asserting a voltage across said open ignition circuit, said voltage being sufficient to form a spark between said first conductive element and said second conductive element to form a closed ignition circuit;

providing a current through said closed ignition circuit, said current being sufficient to sustain a high energy plasma in said space between said first conductive element and said second conductive element;

providing an electromagnet including a plurality of circumferential windings disposed around said second conductive element;

generating, with said electromagnet, a magnetic field that permeates said space and is sufficient to contain said high energy plasma; and providing fuel to said contained, high energy plasma; and wherein said plasma occupies a volume surrounded by said second conductive element, surrounding said first conductive element, and having a height parallel to field lines of said magnetic field; and increasing electrical current through said circumferential windings of said electromagnet compresses said plasma resulting in a reduction in said height.

2. The method of claim 1, wherein said step of providing a first conductive element includes providing a radially symmetric conductive element having an axis of symmetry.

3. The method of claim 2, wherein said step of providing a second conductive element includes:

providing a substantially cylindrical conductive element; and aligning an axis of said cylindrical conductive element with said axis of symmetry.

4. The method of claim 3, wherein said step of generating a magnetic field around said first conductive element and said second conductive element includes aligning said magnetic field along said axis of symmetry.

5. The method of claim 1, further comprising:

providing a heat exchanger disposed to absorb thermal energy generated by said plasma; and providing a thermal transfer medium in contact with said heat exchanger to transfer said thermal energy generated by said plasma from said heat exchanger to another system.

6. The method of claim 5, further comprising utilizing said transferred thermal energy to generate electricity.

7. The method of claim 6, further comprising utilizing said generated electricity to charge an electrical storage system coupled to provide electrical energy sufficient to assert said voltage on said open ignition circuit and provide said current through said closed ignition circuit.

8. The method of claim 1, wherein said step of providing fuel to said plasma includes providing a waste product to said plasma.

9. The method of claim 1, further comprising:

positioning a target material within a predetermined distance of said plasma; and bombarding said target material with particles having energy of at least 5 MeV.

10. The method of claim 1, further comprising intensifying said high energy plasma to an energy level sufficient to induce nuclear reactions.

11. A system comprising:

a first conductive element;

a second conductive element spaced apart from and surrounding said first conductive element, said first conductive element and said second conductive element defining a space therebetween;

a control circuit electrically coupling said first conductive element and said second conductive element to form an open ignition circuit;

a voltage source operative to assert a voltage across said open ignition circuit, said voltage sufficient to form a spark between said first conductive element and said second conductive element to form a closed ignition circuit;

a current source operative to provide a current through said closed ignition circuit, said current sufficient to sustain a high energy plasma;

a magnet including a plurality of circumferential windings disposed around said second conductive element and operative to generate a magnetic field that permeates said space and is sufficient to contain said high energy plasma; and a fuel feeder disposed and operative to provide fuel to said plasma; and wherein said plasma occupies a volume surrounded by said second conductive element, surrounding said first conductive element, and having a height parallel to field lines of said magnetic field; and increasing electrical current through said circumferential windings of said electromagnet compresses said plasma resulting in a reduction in said height.

12. The system of claim 11, wherein said first conductive element is a radially symmetric conductive element having an axis of symmetry.

13. The system of claim 12, wherein:

said second conductive element is a substantially cylindrical conductive element; and an axis of said cylindrical conductive element is aligned with said axis of symmetry.

14. The system of claim 13, wherein said magnetic field is aligned along said axis of symmetry.

15. The system of claim 11, further comprising a heat exchanger disposed to absorb thermal energy generated by said plasma and configured to conduct a thermal transfer medium in contact with said heat exchanger to transfer said thermal energy generated by said plasma from said heat exchanger to another system.

16. The system of claim 15, further comprising a generator operative to utilize said thermal energy transferred by said thermal transfer medium to generate electrical power.

17. The system of claim 16, further comprising an electrical storage system, coupled to receive said electrical power, store at least a portion of said electrical power, and provide said electrical power to said control circuit for use in generating said voltage across said open ignition circuit and said current through said closed ignition circuit.

18. The system of claim 11, wherein said fuel is a waste product.

19. The system of claim 11, further comprising a sample chamber disposed with respect to said plasma such that material within the sample chamber is exposed to particles from said plasma having an energy of at least 5 MeV.

20. The system of claim 11, wherein said high energy plasma is sufficiently energetic that atoms of said solid fuel undergo nuclear reactions.

* * * * *